US012584791B2

(12) United States Patent
Siess

(10) Patent No.: US 12,584,791 B2
(45) Date of Patent: Mar. 24, 2026

(54) COMPENSATION OF OPTICAL ALIGNMENT ISSUES FOR SECTORED-VIEW MULTI-SPECTRAL OPTICAL SENSORS

(71) Applicant: ams Sensors Germany GmbH, Jena (DE)

(72) Inventor: Gunter Siess, Kraftsdorf (DE)

(73) Assignee: ams Sensors Germany GmbH, Jena (DE)

( * ) Notice: Subject to any disclaimer, the term of this patent is extended or adjusted under 35 U.S.C. 154(b) by 97 days.

(21) Appl. No.: 18/723,363

(22) PCT Filed: Dec. 8, 2022

(86) PCT No.: PCT/EP2022/085025
§ 371 (c)(1),
(2) Date: Jun. 21, 2024

(87) PCT Pub. No.: WO2023/117468
PCT Pub. Date: Jun. 29, 2023

(65) Prior Publication Data
US 2025/0067596 A1 Feb. 27, 2025

(30) Foreign Application Priority Data
Dec. 23, 2021 (GB) .................................... 2118956

(51) Int. Cl.
*G01J 3/02* (2006.01)
*G01J 3/28* (2006.01)
(Continued)

(52) U.S. Cl.
CPC ........... *G01J 3/0208* (2013.01); *G01J 3/0229* (2013.01); *G01J 3/2803* (2013.01); *G01J 3/505* (2013.01);
(Continued)

(58) Field of Classification Search
CPC ...... G01J 3/0208; G01J 3/0229; G01J 3/2803; G01J 3/505; G01J 3/513; G01J 2003/2806;
(Continued)

(56) References Cited

U.S. PATENT DOCUMENTS

| | | | |
|---|---|---|---|
| 5,729,011 A * | 3/1998 | Sekiguchi | G01J 3/14 |
| | | | 250/226 |
| 10,345,151 B1 | 7/2019 | Sarkar et al. | |

(Continued)

FOREIGN PATENT DOCUMENTS

| | | | | |
|---|---|---|---|---|
| EP | 0889307 A1 * | 1/1999 | | G01J 3/02 |
| WO | 2011027260 A1 | 3/2011 | | |

OTHER PUBLICATIONS

International Search Report and Written Opinion issued in International Patent Application No. PCT/EP2022/085025, mailed Mar. 13, 2023 (11 pages).
(Continued)

*Primary Examiner* — Abdullahi Nur
(74) *Attorney, Agent, or Firm* — ArentFox Schiff LLP

(57) ABSTRACT

A multi-spectral optical sensor comprises a plurality of apertures, a plurality of lens arrangements, a plurality of optical filters and a monolithic semiconductor chip defining a plurality of sub-arrays of optical detector regions, each sub-array comprising the same number and relative spatial arrangement of optical detector regions and the optical detector regions of each sub-array being arranged on a predetermined pitch in a direction parallel to a surface of the of the semiconductor chip. The multi-spectral optical sensor is configured so that light from a scene incident on any one of the apertures along any given direction of incidence is transmitted through the corresponding lens arrangement and the corresponding optical filter to the corresponding sub-array of optical detector regions so as to form an out-of-
(Continued)

focus image at a plane of the optical detector regions of the corresponding sub-array of optical detector regions.

20 Claims, 20 Drawing Sheets

(51) Int. Cl.
  *G01J 3/50* (2006.01)
  *G01J 3/51* (2006.01)
(52) U.S. Cl.
  CPC ....... *G01J 3/513* (2013.01); *G01J 2003/2806* (2013.01)
(58) Field of Classification Search
  CPC ...... G01J 1/0411; G01J 1/0437; G01J 1/0488; G01J 1/4228; G01J 1/4204; H10F 39/802; H10F 39/806
  See application file for complete search history.

(56) References Cited

U.S. PATENT DOCUMENTS

| | | | |
|---|---|---|---|
| 2008/0048102 A1* | 2/2008 | Kurtz | H10F 77/45 |
| | | | 136/246 |
| 2015/0233762 A1* | 8/2015 | Goldring | G01J 3/0229 |
| | | | 356/402 |
| 2016/0165202 A1 | 6/2016 | Lee | |
| 2016/0232828 A1 | 8/2016 | Jia et al. | |
| 2017/0299434 A1* | 10/2017 | Hu | G01J 3/32 |
| 2018/0013948 A1* | 1/2018 | Chen | H04N 23/55 |
| 2019/0080668 A1 | 3/2019 | Holenarsipur et al. | |

OTHER PUBLICATIONS

International Preliminary Report on Patentability issued in corresponding International Application No. PCT/EP2022/085025 dated Jun. 20, 2024.

* cited by examiner

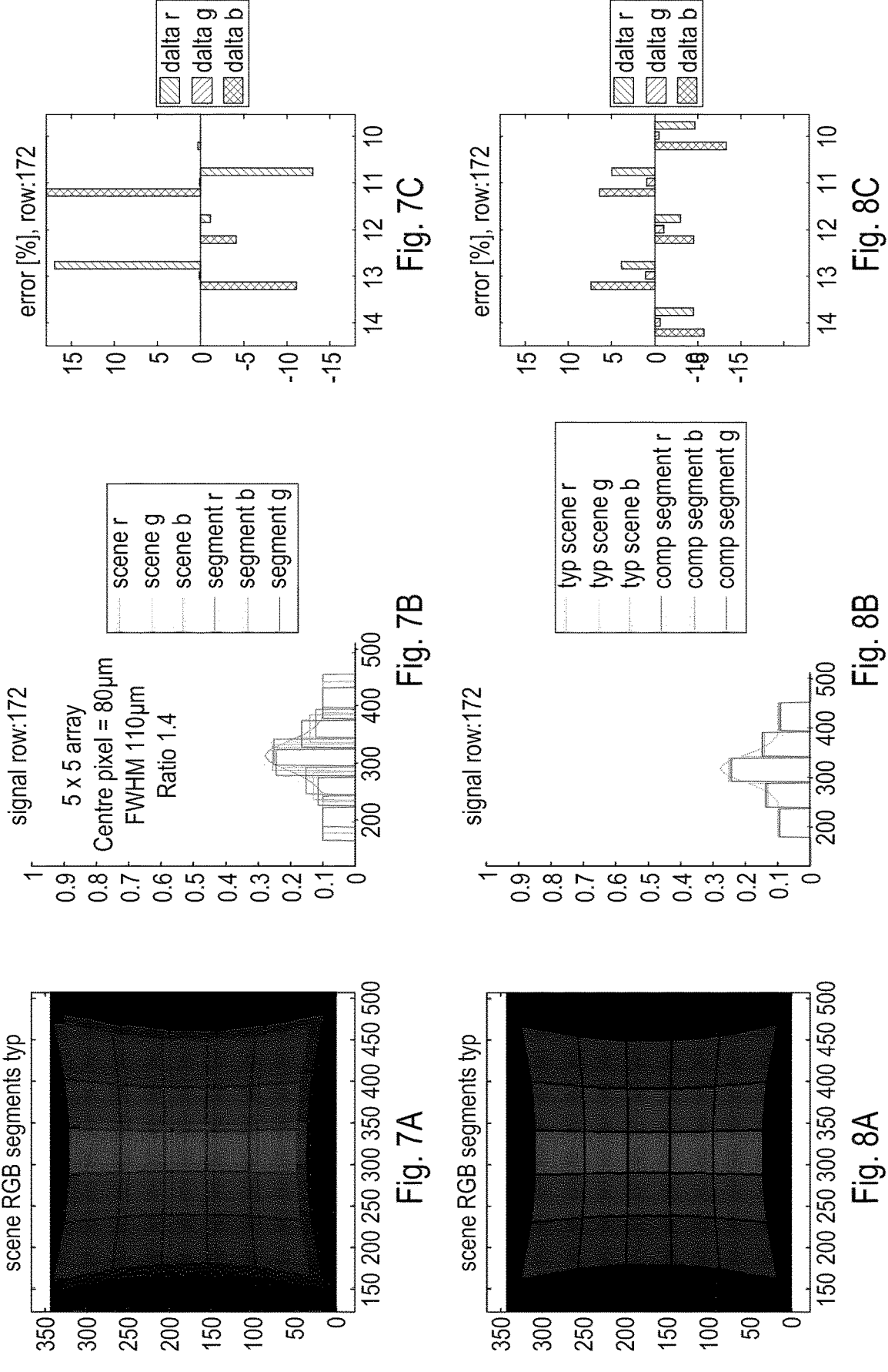

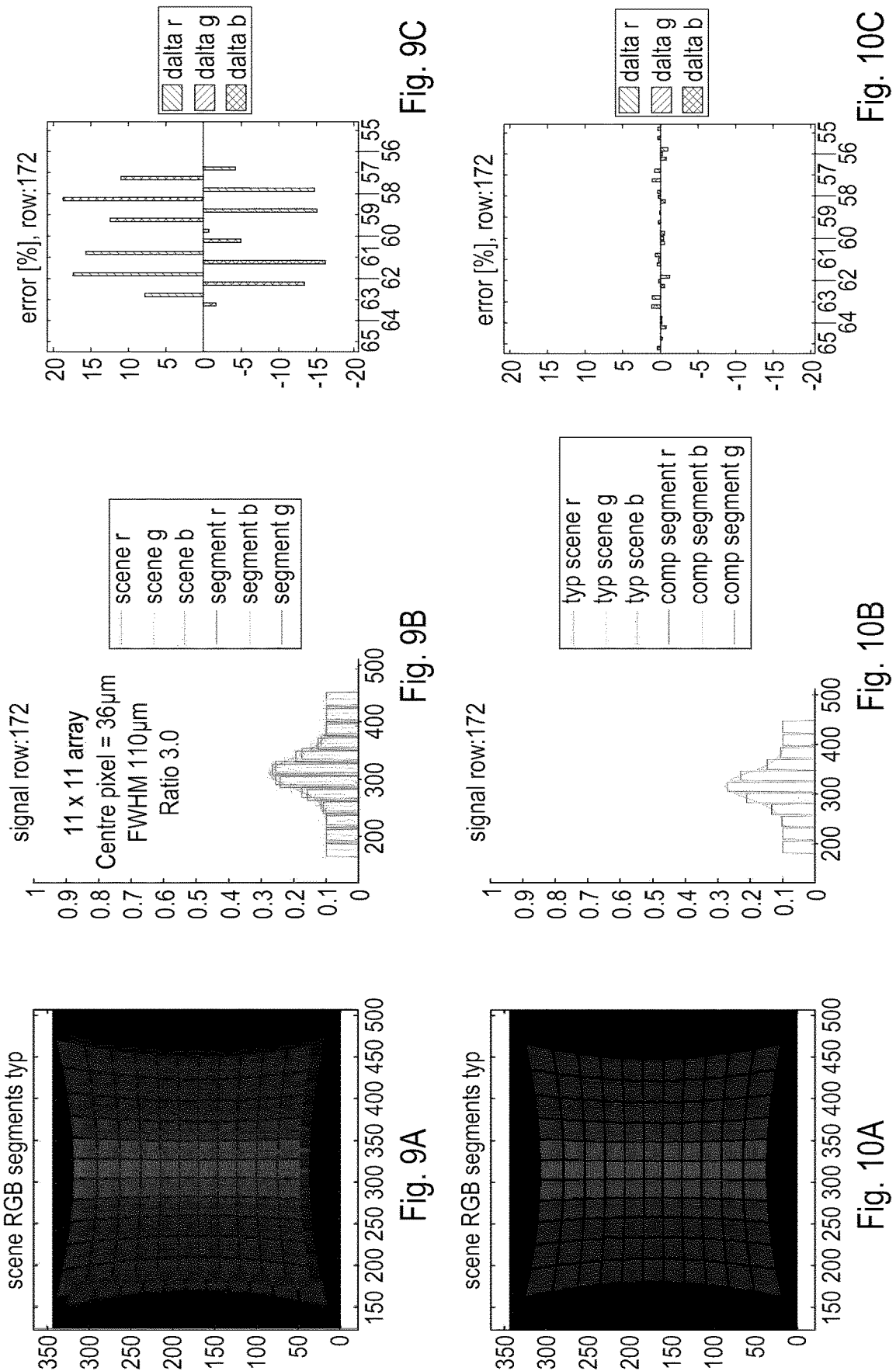

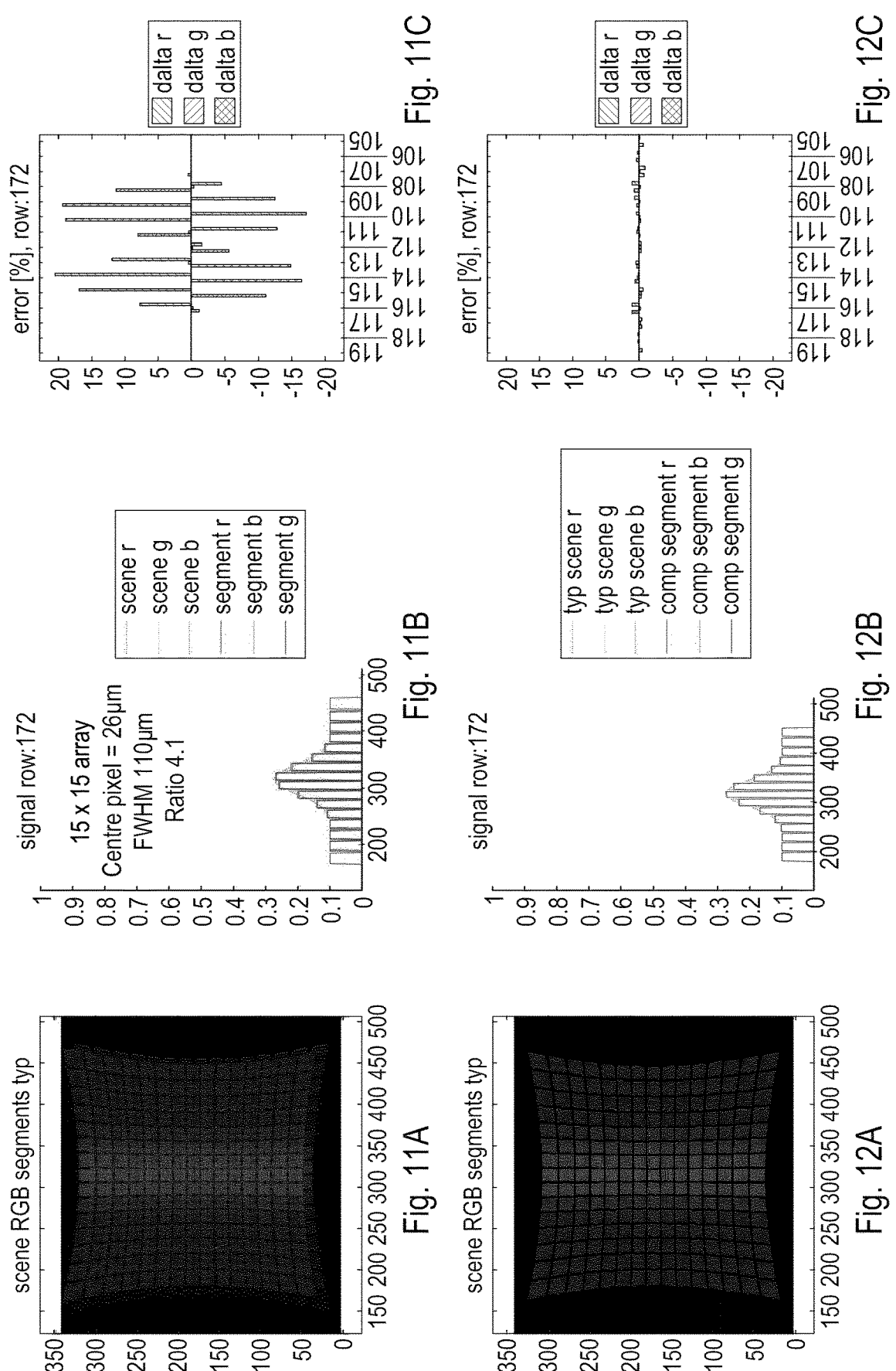

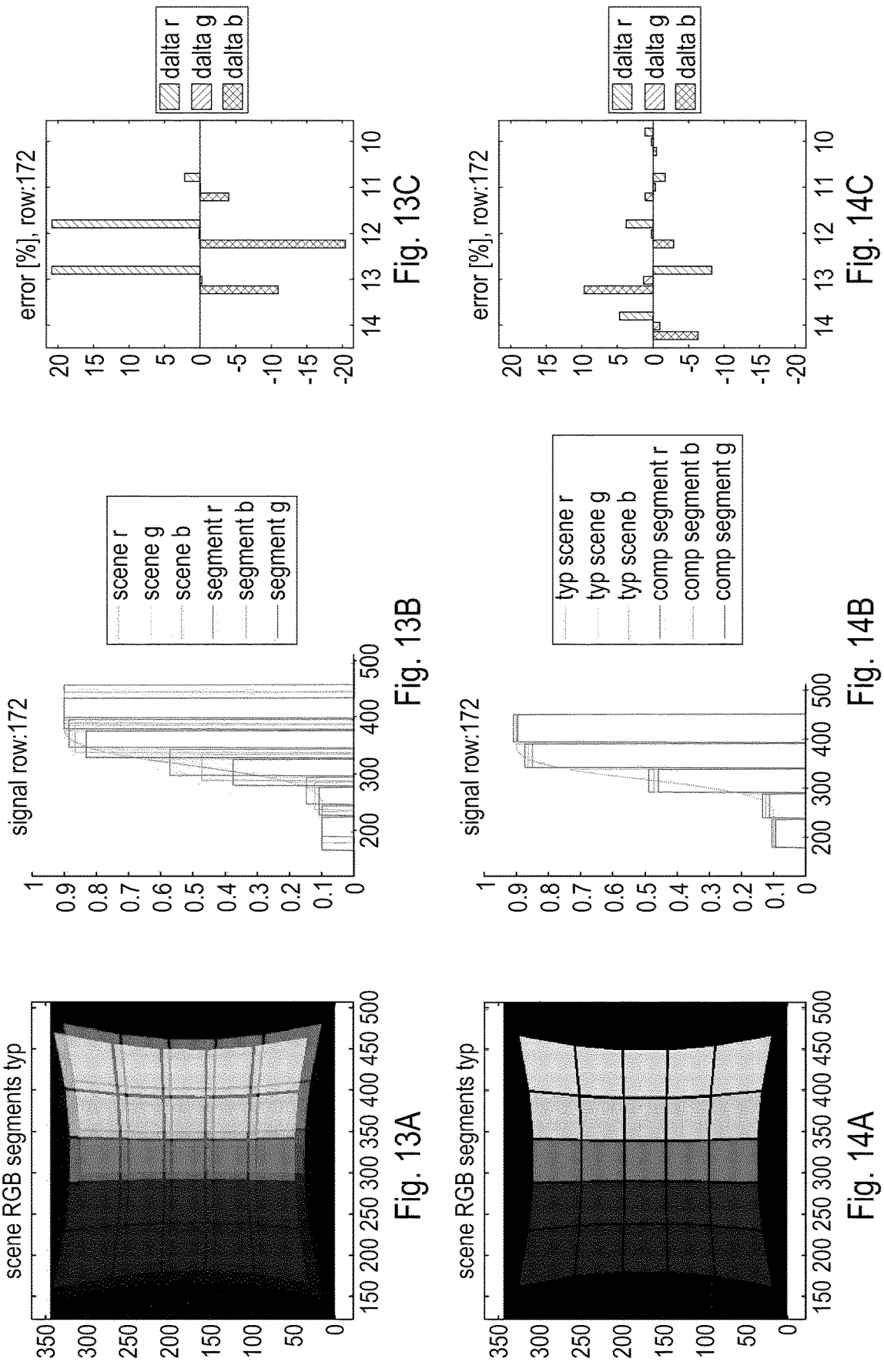

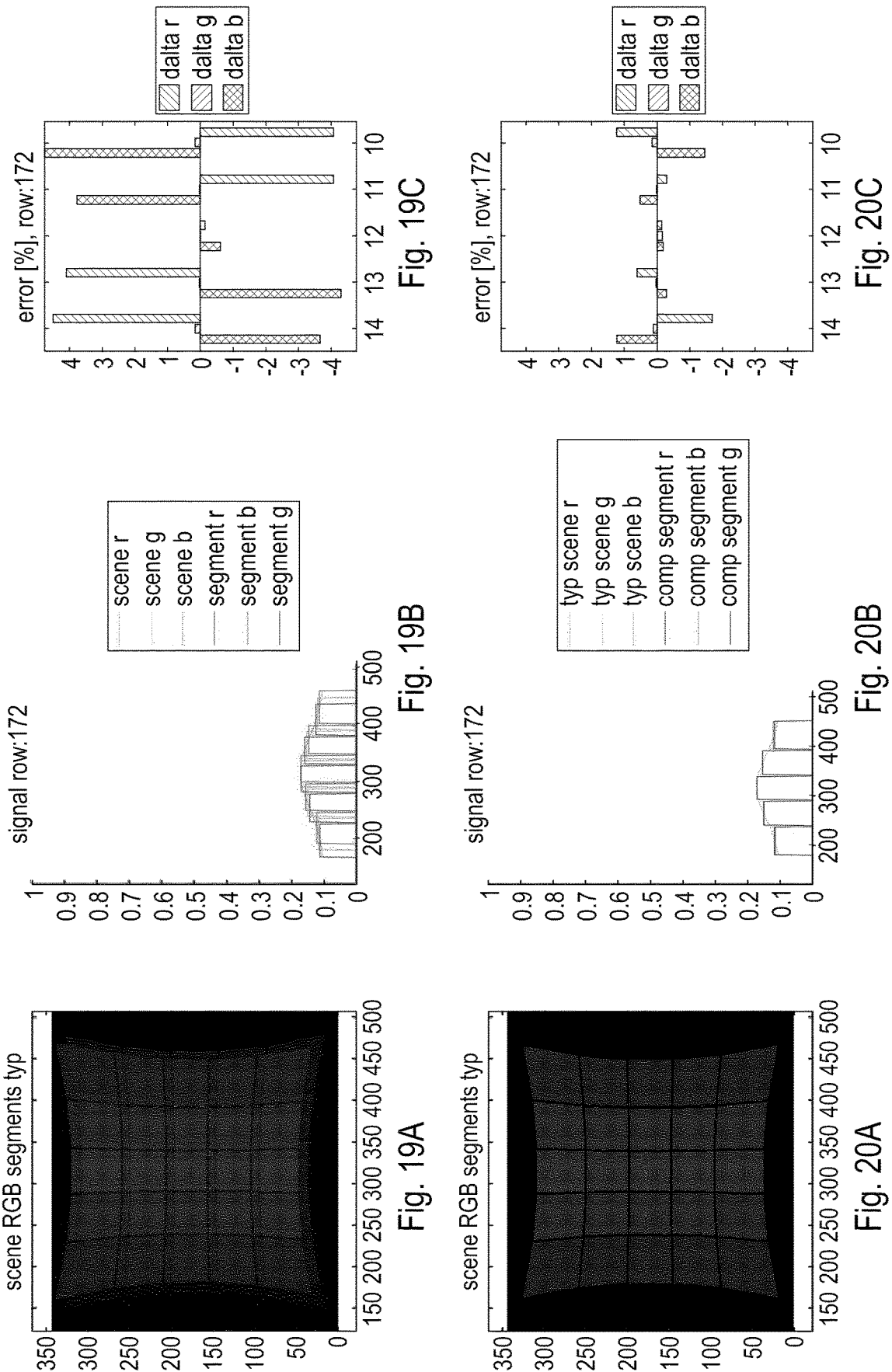

COMPENSATION OF OPTICAL ALIGNMENT ISSUES FOR SECTORED-VIEW MULTI-SPECTRAL OPTICAL SENSORS

CROSS-REFERENCE TO RELATED APPLICATIONS

This application is a 35 U.S.C. § 371 National Phase of PCT Application No. PCT/EP2022/085025, filed on Dec. 8, 2022, which claims priority to, and the benefit of, British Patent Application No. 2118956.8, filed on Dec. 23, 2021, the disclosures of which are hereby incorporated by reference herein in their entireties.

FIELD

The present disclosure relates to a multi-spectral optical sensor configured to allow spectral reconstruction of light incident on the multi-spectral optical sensor from different directions in a scene in the presence of any misalignment between one or more of the optical components of the multi-spectral optical sensor, a multi-spectral optical system including the multi-spectral optical sensor, and an image sensing system including the multi-spectral optical system.

BACKGROUND

Colour constancy is a desirable attribute of image-sensing devices, such as cameras. Colour constancy refers to a capability of observing a feature or object as being of a relatively constant colour under different illuminations. That is, an appearance of an image captured by a camera may be affected by an ambient illumination. By means of example, if a colour temperature of an ambient light source is relatively low, e.g. in the region of 3000 Kelvin as may be the case for an incandescent light source, an image of a white object exposed to the ambient light source will comprise a reddish hue. In contrast, for an ambient light source with a high colour temperature, e.g. in the region of 6000 Kelvin as may be the case for daylight on an overcast day, the image of the white object will comprise a slight blueish hue. That is, the object will be observed by a camera as comprising a colour that depends upon the illumination of the object by the ambient light source.

It is known to compensate for such effects by using a multi-spectral ambient light sensor (ALS) to measure spectral information relating to a scene. For example, with reference initially to FIG. 1A, there is shown a smartphone 1 including a multi-spectral ALS 2, a camera 4 and cover glass 8 which covers the multi-spectral ALS 2 and the camera 4, wherein the multi-spectral ALS 2 is configured to measure the spectral distribution of light from a scene incident on the camera 4.

FIG. 1B shows a detailed cross-sectional view of the multi-spectral ALS 2 and the camera 4. The multi-spectral ALS 2 has a plurality of optical detector regions 11. The multi-spectral ALS 2 is configured so that each optical detector region 11 detects a different range of wavelengths, for example because the multi-spectral ALS 2 includes a plurality of different optical filters (not shown explicitly in FIG. 1B), wherein each optical filter is configured to only transmit a corresponding different range of wavelengths onto a corresponding one of the optical detector regions 11. In the interests of clarity, only three optical detector regions 11 are shown in FIG. 1B. However, one of ordinary skill in the art will understand that the multi-spectral ALS sensor 2 may have more than three optical detector regions 11 or less than three optical detector regions 11.

The multi-spectral ALS 2 further includes a housing 20, s a diffuser 30, and an IR cut filter 32 located between the cover glass 8 and the housing 20.

The housing 20 defines an aperture or a window 22 for admitting light into the housing 20 via the cover glass 8, the diffuser 30 and the IR cut filter 32. The multi-spectral ALS 2 has an optical axis 40 which is normal to a front surface of the multi-spectral ALS 2. Moreover, as will be understood by one of ordinary skill in the art, use of the diffuser 30 provides the multi-spectral ALS 2 with a field of view (FOV) 42 which defines a large solid angle around the optical axis 40. Each optical detector region 11 detects a different range of wavelengths incident on the optical detector region 11 from all of the different directions of incidence across the entire FOV 42 of the multi-spectral ALS 2.

The camera 4 has an optical axis 50 which is normal to a front surface of an image sensor (not shown) of the camera 4 and which is parallel to the optical axis 40 of the multi-spectral ALS 2. The camera 4 has a FOV 52 which defines a solid angle around the optical axis 50 of the camera 4, wherein the solid angle of the FOV 52 of the camera 4 is comparable to, or less than, the solid angle of the FOV 42 of the multi-spectral ALS 2.

The smartphone 1 uses white balancing, and preferably automatic white balancing (AWB), to adjust the colouration of the images captured under different illuminations. For example, the smartphone 1 may have predefined settings for typical lighting conditions such as daylight, fluorescent lighting or incandescent lighting, wherein in some instances the predefined settings may be automatically selected.

Existing techniques for white balancing include image processing by applying an algorithm based on a "Gray-World Theory" or a "White Patch Theory". The Gray World Theory is based on an assumption that the average reflectance in a captured image is achromatic. That is, the average of three colour channels: red, green and blue, should be roughly equal. The White Patch Theory is based on an assumption that a brightest pixel in a captured image corresponds to a reflection of the ambient light source, and therefore the brightest pixel may correspond to a spectrum of the ambient illumination. Both approaches have known limitations and, notably, both approaches tend to produce substantially different results.

Moreover, different parts of a scene may be subject to different ambient lighting conditions. For example, even different parts of a uniform coloured object in a scene may appear differently according to the corresponding ambient lighting conditions of the different parts of the uniform coloured object. Accordingly, it is desirable to be able to correct a captured image of a scene for the effects of different ambient illumination conditions on different parts of the scene, without incurring the shortcomings of the prior art AWB methods.

It is known to detect the optical power in different spectral ranges incident on a multi-spectral ALS from different directions of a scene and to use spectral reconstruction to determine the spectrum of the light incident on the multi-spectral ALS from the different directions of the scene. However, sharp changes in the scene lighting conditions can cause inaccuracies when using AWB to adjust the colouration of the images captured under different illuminations. This problem is compounded further when the light source or sudden change is dynamic and moves around a scene.

Moreover, it has been found that the accuracy with which the spectrum of the light incident on the multi-spectral ALS from the different directions of the scene can be determined using spectral reconstruction is limited by any misalignment between one or more of the optical components of the multi-spectral ALS. Accordingly, it is desirable to be able to improve the accuracy with which the spectrum of the light incident on the multi-spectral ALS from the different directions of the scene can be determined.

SUMMARY

According to an aspect of the present disclosure there is provided a multi-spectral optical sensor comprising:
  a plurality of apertures;
  a plurality of lens arrangements;
  a plurality of optical filters; and
  a monolithic semiconductor chip defining a plurality of sub-arrays of optical detector regions, each sub-array comprising the same number and relative spatial arrangement of optical detector regions and the optical detector regions of each sub-array being arranged on a predetermined pitch in a direction parallel to a surface of the of the semiconductor chip,
  wherein each sub-array of optical detector regions is aligned with a corresponding optical filter, a corresponding lens arrangement and a corresponding aperture, and
  wherein the multi-spectral optical sensor is configured so that light from a scene incident on any one of the apertures along any given direction of incidence is transmitted through said one of the apertures, the corresponding lens arrangement and the corresponding optical filter to the corresponding sub-array of optical detector regions so as to form an out-of-focus image at a plane of the optical detector regions of the corresponding sub-array of optical detector regions such that a ratio of a full-width half maximum (FWHM) of an optical intensity distribution of the out-of-focus image to the predetermined pitch of the optical detector regions in the direction parallel to the surface of the semiconductor chip is greater than or equal to 2.0 and less than or equal to 4.0.

In use, the optical detector regions of the same sub-array of optical detector regions may detect light incident on the multi-spectral optical sensor from different directions in the same spectral range and corresponding optical detector regions of different sub-arrays of optical detector regions may detect light incident on the multi-spectral optical sensor from the same direction in different spectral ranges. The detected signals may be used to reconstruct the spectrum of the light incident on the multi-spectral optical sensor from different directions in a scene. The aperture, the corresponding lens arrangement, the corresponding optical filter and the corresponding sub-array of optical detector regions may together form a spectral channel. Any misalignment of the aperture, the corresponding lens arrangement, the corresponding optical filter and the corresponding sub-array of optical detector regions may lead to inaccuracies in the reconstructed spectrum. Such inaccuracies may be at least partially compensated by measuring a degree of misalignment of each spectral channel and adjusting the detected signals for each spectral channel based on the measured degree of misalignment. It has been found that a ratio of the full-width half maximum (FWHM) of the optical intensity distribution of the out-of-focus image to the predetermined pitch of the optical detector regions in the direction parallel to the surface of the semiconductor chip is greater than or equal to 2.0 and less than or equal to 4.0 allows misalignment of each spectral channel to be compensated sufficiently so as to allow accurate spectral reconstruction without unduly increasing the number of optical detector regions for a given field of view (FOV) of the multi-spectral optical sensor.

Optionally, the ratio of a full-width half maximum (FWHM) of the optical intensity distribution of the out-of-focus image to the predetermined pitch of the optical detector regions in the direction parallel to the surface of the semiconductor chip is greater than or equal to 2.5 and less than or equal to 3.5, or substantially equal to 3.

Optionally, each optical filter is located between the corresponding lens arrangement and the corresponding sub-array of optical detector regions so that light from the scene passes through the corresponding lens arrangement before passing through the corresponding optical filter.

Optionally, each lens arrangement is located between the corresponding aperture and the corresponding optical filter so that light from the scene passes through the corresponding aperture before the light is incident on the corresponding lens arrangement.

Optionally, each aperture is located between the corresponding lens arrangement and the corresponding optical filter so that light from the scene passes through the corresponding lens arrangement before the light is incident on the corresponding aperture.

Optionally, each lens arrangement defines the corresponding aperture.

Optionally, each lens arrangement is aligned to focus the incident light onto a focal plane adjacent to the plane of the optical detector regions to form the out-of-focus image at the plane of the optical detector regions.

Optionally, the focal plane of each lens arrangement is arranged at a predetermined distance from the plane of the optical detector regions.

Optionally, the multi-spectral optical sensor comprises a plurality of diffuser elements, wherein each diffuser element is configured to diffuse the incident light to form the out-of-focus image at the plane of the optical detector regions.

Optionally, the plurality of lens arrangements comprises one or more microlens arrays (MLA).

Optionally, at least some of the lens arrangements are defined by, or formed on, an optical substrate.

Optionally, each lens arrangement comprises one lens element or more than one lens element, for example two lens elements.

Optionally, each lens arrangement comprises one or more Fresnel lenses.

According to an aspect of the present disclosure there is provided multi-spectral optical sensing system, comprising:
  the multi-spectral optical sensor as described above; and
  a processing resource
  wherein the multi-spectral optical sensor and the processing resource are configured for communication with one another, and
  wherein the processing resource is configured to:
    associate different electrical signals generated by different optical detector regions of the same sub-array of optical detector regions with light incident on the multi-spectral optical sensor from a scene along corresponding different directions of incidence, and
    associate different electrical signals generated by corresponding optical detector regions of different sub-arrays of optical detector regions with light incident on the multi-spectral optical sensor from the scene along the same direction of incidence.

Optionally, the processing resource is configured to associate the electrical signal generated by an optical detector region with the optical transmission spectrum of the corresponding optical filter.

Optionally, the processing resource is configured to determine an ambient light source classification for each direction of incidence of a plurality of different directions of incidence based on a comparison between the electrical signal values corresponding to each direction of incidence and predefined spectral data.

Optionally, the predefined spectral data comprises a plurality of spectra, each spectrum corresponding to a different known type or kind of ambient light source.

According to an aspect of the present disclosure there is provided an image sensing system, comprising:

the multi-spectral optical sensing system as described above; and an image sensor having a known spatial relationship relative to the multi-spectral optical sensor, wherein the image sensor and the processing resource are configured for communication with one another, and wherein the processing resource is configured to adapt an image sensed by the image sensor based upon the ambient light source classification for each direction of incidence.

Optionally, the processing resource is configured to adapt the image by white-balancing the image based upon one or more parameters of the ambient light source classification for each direction.

Optionally, said adapting comprises gradient white-balancing the image based upon one or more parameters of the ambient light source classification for each direction of incidence.

According to an aspect of the present disclosure there is provided electronic device comprising the multi-spectral optical, the multi-spectral optical system and/or the image sensing system as described above.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

A multi-spectral optical sensor, a multi-spectral optical system, an image sensing system and associated methods will now be described by way of non-limiting example only with reference to the drawings of which:

FIG. 7A shows a spatially modulated optical intensity distribution of a first blurred scene for three differently misaligned spectral channels for a FWHM intensity blur of 110 μm and optical detector regions arranged in a 5×5 array on a pitch of 80 μm;

FIG. 7B shows simulated detected signal distributions and simulated detected signals detected by the optical detector regions of each misaligned spectral channel corresponding to the spatially modulated optical intensity distribution of FIG. 7A;

FIG. 7C shows the % error in the signal detected by the optical detector regions of each misaligned spectral channel corresponding to the spatially modulated optical intensity distribution of FIG. 7A;

FIG. 8A shows a compensated spatially modulated optical intensity distribution of the first blurred scene for three differently misaligned spectral channels for a FWHM intensity blur of 110 μm and optical detector regions arranged in a 5×5 array on a pitch of 80 μm;

FIG. 8B simulated detected signal distributions and simulated detected signals detected by the optical detector regions of each misaligned spectral channel corresponding to the spatially modulated optical intensity distribution of FIG. 8A;

FIG. 8C shows the % error in the signal detected by the optical detector regions of each misaligned spectral channel corresponding to the spatially modulated optical intensity distribution of FIG. 8A;

FIG. 9A shows a spatially modulated optical intensity distribution of the first blurred scene for three differently misaligned spectral channels for a FWHM intensity blur of 110 μm and optical detector regions arranged in a 11×11 array on a pitch of 36 μm;

FIG. 9B shows simulated detected signal distributions and simulated detected signals detected by the optical detector regions of each misaligned spectral channel corresponding to the spatially modulated optical intensity distribution of FIG. 9A;

FIG. 9C shows the % error in the signal detected by the optical detector regions of each misaligned spectral channel corresponding to the spatially modulated optical intensity distribution of FIG. 9A;

FIG. 10A shows a compensated spatially modulated optical intensity distribution of the first blurred scene for three differently misaligned spectral channels for a FWHM intensity blur of 110 µm and optical detector regions arranged in a 11×11 array on a pitch of 36 µm;

FIG. 10B simulated detected signal distributions and simulated detected signals detected by the optical detector regions of each misaligned spectral channel corresponding to the spatially modulated optical intensity distribution of FIG. 10A;

FIG. 10C shows the % error in the signal detected by the optical detector regions of each misaligned spectral channel corresponding to the spatially modulated optical intensity distribution of FIG. 10A;

FIG. 11A shows a spatially modulated optical intensity distribution of the first blurred scene for three differently misaligned spectral channels for a FWHM intensity blur of 110 µm and optical detector regions arranged in a 15×15 array on a pitch of 26 µm;

FIG. 11B shows simulated detected signal distributions and simulated detected signals detected by the optical detector regions of each misaligned spectral channel corresponding to the spatially modulated optical intensity distribution of FIG. 11A;

FIG. 11C shows the % error in the signal detected by the optical detector regions of each misaligned spectral channel corresponding to the spatially modulated optical intensity distribution of FIG. 11A;

FIG. 12A shows a compensated spatially modulated optical intensity distribution of the first blurred scene for three differently misaligned spectral channels for a FWHM intensity blur of 110 µm and optical detector regions arranged in a 15×15 array on a pitch of 26 µm;

FIG. 12B simulated detected signal distributions and simulated detected signals detected by the optical detector regions of each misaligned spectral channel corresponding to the spatially modulated optical intensity distribution of FIG. 12A;

FIG. 12C shows the % error in the signal detected by the optical detector regions of each misaligned spectral channel corresponding to the spatially modulated optical intensity distribution of FIG. 12A;

FIG. 13A shows a spatially modulated optical intensity distribution of a second blurred scene for three differently misaligned spectral channels for a FWHM intensity blur of 110 µm and optical detector regions arranged in a 5×5 array on a pitch of 80 µm;

FIG. 13B shows simulated detected signal distributions and simulated detected signals detected by the optical detector regions of each misaligned spectral channel corresponding to the spatially modulated optical intensity distribution of FIG. 13A;

FIG. 13C shows the % error in the signal detected by the optical detector regions of each misaligned spectral channel corresponding to the spatially modulated optical intensity distribution of FIG. 13A;

FIG. 14A shows a compensated spatially modulated optical intensity distribution of the second blurred scene for three differently misaligned spectral channels for a FWHM intensity blur of 110 µm and optical detector regions arranged in a 5×5 array on a pitch of 80 µm;

FIG. 14B simulated detected signal distributions and simulated detected signals detected by the optical detector regions of each misaligned spectral channel corresponding to the spatially modulated optical intensity distribution of FIG. 14A;

FIG. 14C shows the % error in the signal detected by the optical detector regions of each misaligned spectral channel corresponding to the spatially modulated optical intensity distribution of FIG. 14A;

FIG. 19A shows a spatially modulated optical intensity distribution of a third blurred scene for three differently misaligned spectral channels for a FWHM intensity blur of 110 µm and optical detector regions arranged in a 5×5 array on a pitch of 80 µm;

FIG. 19B shows simulated detected signal distributions and simulated detected signals detected by the optical detector regions of each misaligned spectral channel corresponding to the spatially modulated optical intensity distribution of FIG. 19A;

FIG. 19C shows the % error in the signal detected by the optical detector regions of each misaligned spectral channel corresponding to the spatially modulated optical intensity distribution of FIG. 19A;

FIG. 20A shows a compensated spatially modulated optical intensity distribution of the third blurred scene for three differently misaligned spectral channels for a FWHM intensity blur of 110 μm and optical detector regions arranged in a 5×5 array on a pitch of 80 μm;

FIG. 20B simulated detected signal distributions and simulated detected signals detected by the optical detector regions of each misaligned spectral channel corresponding to the spatially modulated optical intensity distribution of FIG. 20A;

FIG. 20C shows the % error in the signal detected by the optical detector regions of each misaligned spectral channel corresponding to the spatially modulated optical intensity distribution of FIG. 20A;

DETAILED DESCRIPTION OF THE DRAWINGS

Figures 1A, 1B:
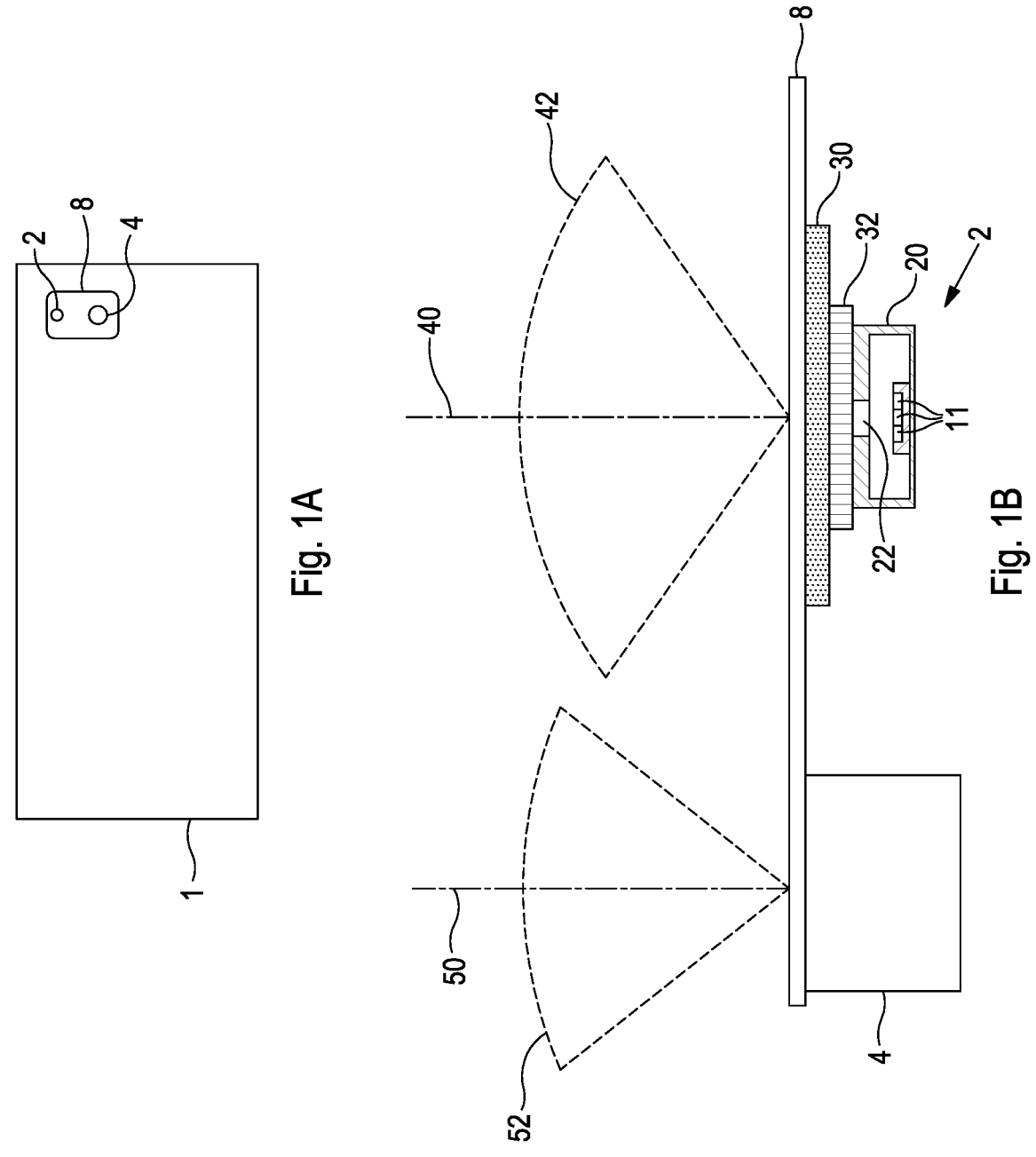
FIG. 1A is a schematic of a rear side of a prior art electronic device in the form of a prior art smartphone having a prior art multi-spectral ambient light sensor (ALS) arrangement and a camera.
FIG. 1B is a schematic cross-section of the prior art multi-spectral ALS and the camera of the prior art smartphone of FIG. 1A.
Figures 2A, 2B:
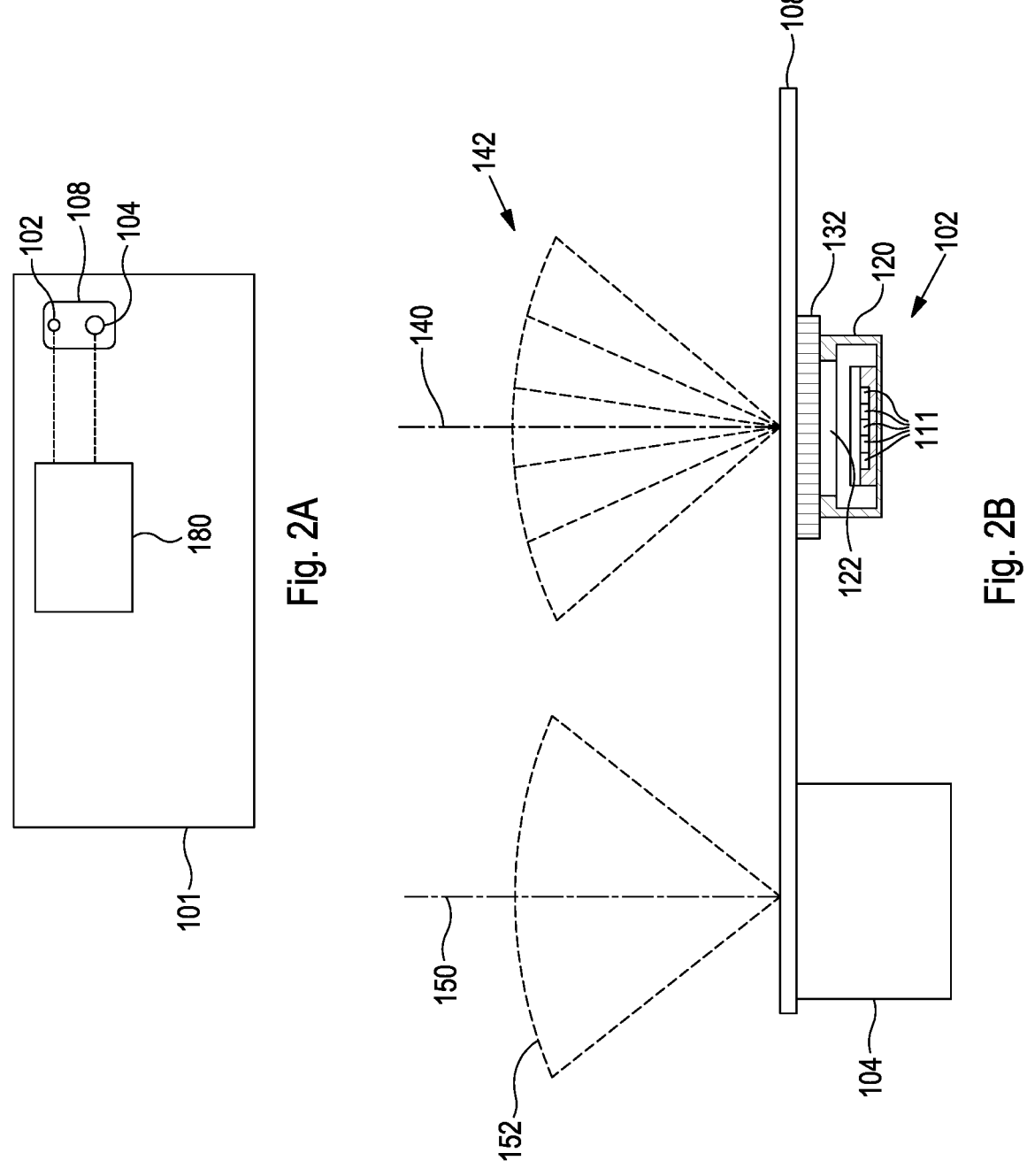
FIG. 2A is a schematic of a rear side of an electronic device in the form of a smartphone having a multi-spectral ALS arrangement and a camera.
FIG. 2B is a schematic cross-section of the multi-spectral ALS arrangement and the camera of the smartphone of FIG. 2A.

Referring to FIG. 2A there is shown a smartphone 101 including a multi-spectral optical sensor in the form of a sectored-view multi-spectral ALS 102, a camera 104 having a known spatial relationship relative to the multi-spectral ALS 102, and cover glass 108 which covers the multi-spectral ALS 102 and the camera 104.

FIG. 2B shows a detailed cross-sectional view of the multi-spectral ALS 102 and the camera 104. The multi-spectral ALS 102 includes an IR cut filter 132 located behind or under the cover glass 108.

As will be described in more detail below, the multi-spectral ALS 102 defines a plurality of sub-arrays of square optical detector regions 111, wherein each sub-array has 5×5 optical detector regions 111. However, in the interests of clarity, it should be understood that only the optical detector regions 111 of a single sub-array of 5×5 optical detector regions 111 is shown in FIG. 2B. The multi-spectral ALS 102 further includes a housing 120 which defines an aperture or a window 122 for admitting light into the housing 120 via the cover glass 108 and the IR cut filter 132. The multi-spectral ALS 102 has an optical axis 140 which is normal to a front surface of the multi-spectral ALS 102.

As will be described below, the multi-spectral ALS 102 is configured to discriminate between light incident on the multi-spectral ALS 102 along different directions of incidence and to measure the spectral distribution of the light incident on the multi-spectral ALS 102 for each different direction of incidence across a FOV 142 which defines a solid angle around the optical axis 140 of the multi-spectral ALS 102. Specifically, the multi-spectral ALS 102 is configured to discriminate between light incident on the multi-spectral ALS 102 from different sectors of the FOV 142 as represented by the dashed lines in FIG. 2B and to measure the spectral distribution of the light incident on the multi-spectral ALS 102 from each sector of the FOV 142. The camera 104 also has an optical axis 150 which is normal to a front surface of an image sensor chip (not shown) of the camera 104 and which is parallel to the optical axis 140 of the multi-spectral ALS 102. The camera 104 has a FOV 152 which defines a solid angle around the optical axis 150 of the camera 104, wherein the solid angle of the FOV 152 of the camera 104 is comparable to the solid angle of the FOV 142 of the multi-spectral ALS 102.

Figure 3A:
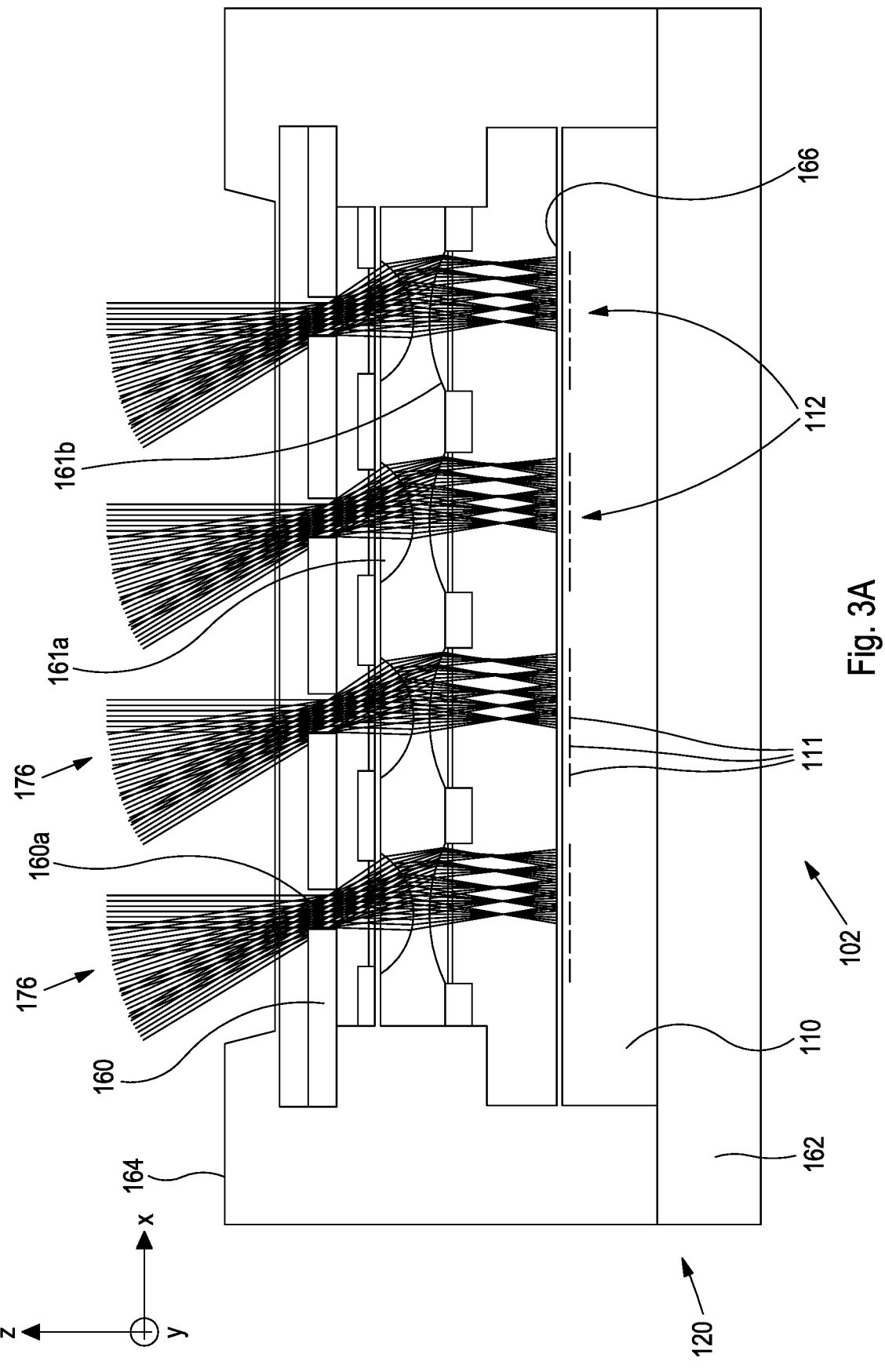
FIG. 3A is a schematic of a multi-spectral ALS of the multi-spectral ALS arrangement of FIG. 2A.

As shown in FIG. 3A, the multi-spectral ALS 102 includes an aperture member 160 defining a plurality of apertures 160a, a first microlens array (MLA) 161a, a second microlens array (MLA) 161b, a monolithic multi-spectral ALS semiconductor chip 110, a PCB 162 and a frame member 164. The monolithic multi-spectral ALS semiconductor chip 110 and the frame member 164 are mounted on the PCB 162 with the frame member 164 located around the monolithic multi-spectral ALS semiconductor chip 110. The PCB 162 and the frame member 164 together form the housing 120 which holds the aperture member 160, and the first and second MLAs 161a, 161b in alignment with the monolithic multi-spectral ALS semiconductor chip 110.

Figure 4:
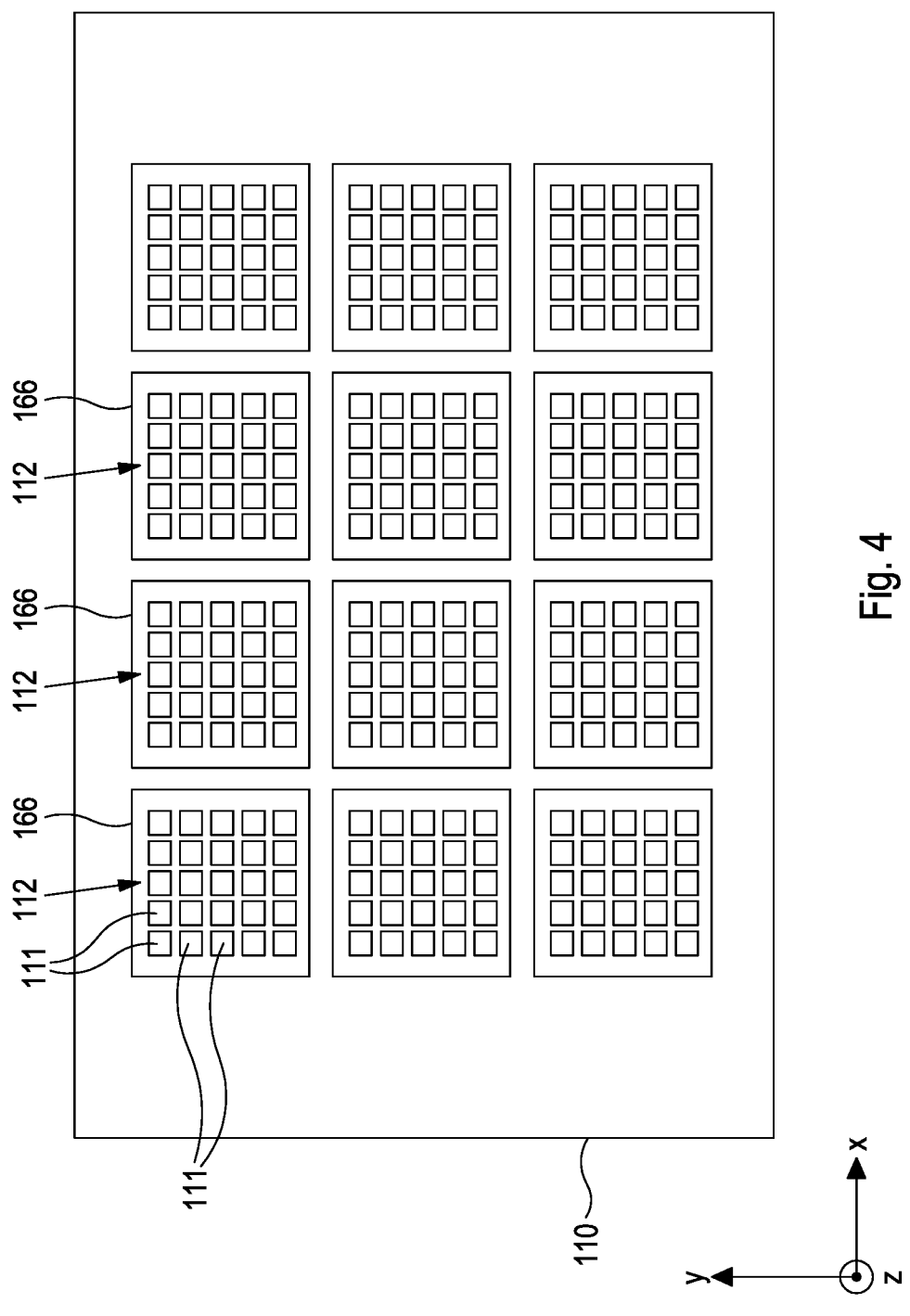
FIG. 4 is a schematic plan view of a monolithic multi-spectral ambient light sensor (ALS) semiconductor chip of the multi-spectral ALS of FIG. 3A.

As shown in FIG. 4, the monolithic multi-spectral ALS semiconductor chip 110 defines a plurality of sub-arrays 112 of square optical detector regions 111 in the form of a 3×4 array of sub-arrays 112 of square optical detector regions 111, wherein each sub-array 112 has the same number and relative spatial arrangement of optical detector regions 111 as each of the other sub-arrays 112. Specifically, each of the sub-arrays 112 defines a 5×5 sub-array of optical detector regions 111.

The monolithic multi-spectral ALS semiconductor chip 110 includes a plurality of optical filters 166 formed on, or attached to, the monolithic multi-spectral ALS semiconductor chip 110 in front of a corresponding sub-array 112 of optical detector regions 111. Each optical filter 166 has a corresponding optical transmission spectrum. Specifically, each optical filter 166 is a passband optical interference filter which defines a corresponding spectral passband. The optical filters 166 may, for example define different spectral passbands.

Figure 3B:
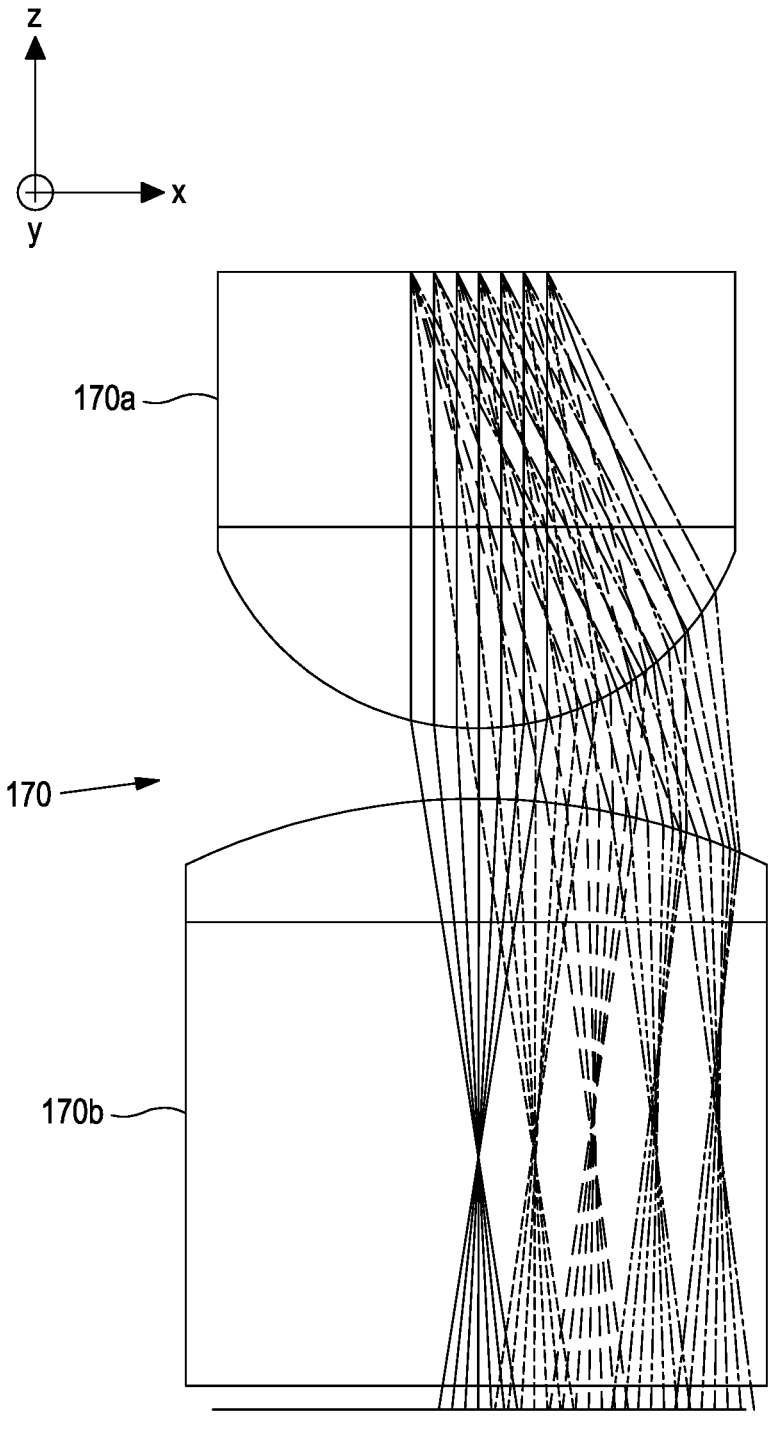
FIG. 3B is a schematic of a lens arrangement of the multi-spectral ALS of FIG. 3A.

As shown in FIG. 3B, the first and second MLAs 161a, 161b define a plurality of lens arrangements 170, wherein each lens arrangement 170 has two convex lens elements 170a and 170b disposed towards each other.

Each optical filter 166 is aligned between a corresponding lens arrangement 170 and a corresponding sub-array 112 of optical detector regions 111

Moreover, it should be understood that the aperture member 160, the first and second MLAs 161a, 161b and the monolithic multi-spectral ALS semiconductor chip 110 are aligned so that each sub-array 112 of optical detector regions 111 and the corresponding optical filter 166 are aligned in x and y with a corresponding one of the lens arrangements 170 and a corresponding one of the apertures 160a so as to form a spectral channel 176.

Furthermore, as shown in FIG. 3A, each spectral channel 176 is configured so that, in use, any light which is incident any one of the apertures 160a of the multi-spectral ALS 102 along any given direction of incidence is focussed by the corresponding lens arrangement 170 onto a focal plane adjacent, for example in front, over or above, the plane of the corresponding sub-array 112 of optical detector regions 111, before passing through the corresponding optical filter 166 and forming an out-of-focus image at a plane of the optical detector regions 111 of the corresponding sub-array of optical detector regions 112. For example, for a given configuration of the lens arrangement 170, the separation between the aperture 160a and the lens arrangement 170 and the separation between the lens arrangement 170 and the monolithic multi-spectral ALS semiconductor chip 110 may be selected such that any light which is incident any one of the apertures 160a of the multi-spectral ALS 102 along any given direction of incidence is focussed by the corresponding lens arrangement 170 onto a focal plane adjacent, for example in front, over or above, the plane of the corresponding sub-array 112 of optical detector regions 111, before passing through the corresponding optical filter 166 and forming an out-of-focus image at a plane of the optical detector regions 111 of the corresponding sub-array of optical detector regions 112.

By focussing the incident light onto a focal point in a plane adjacent (i.e. that does not coincide with) the plane of the optical detector regions 111 rather than onto a plane that does coincide with the plane of the optical detector regions 111, the image formed by the light when it does reach the optical detector regions 111 is out-of-focus and thus blurred when it is detected. This provides a number significant advantages as will be described below.

Figures 5A, 5B:
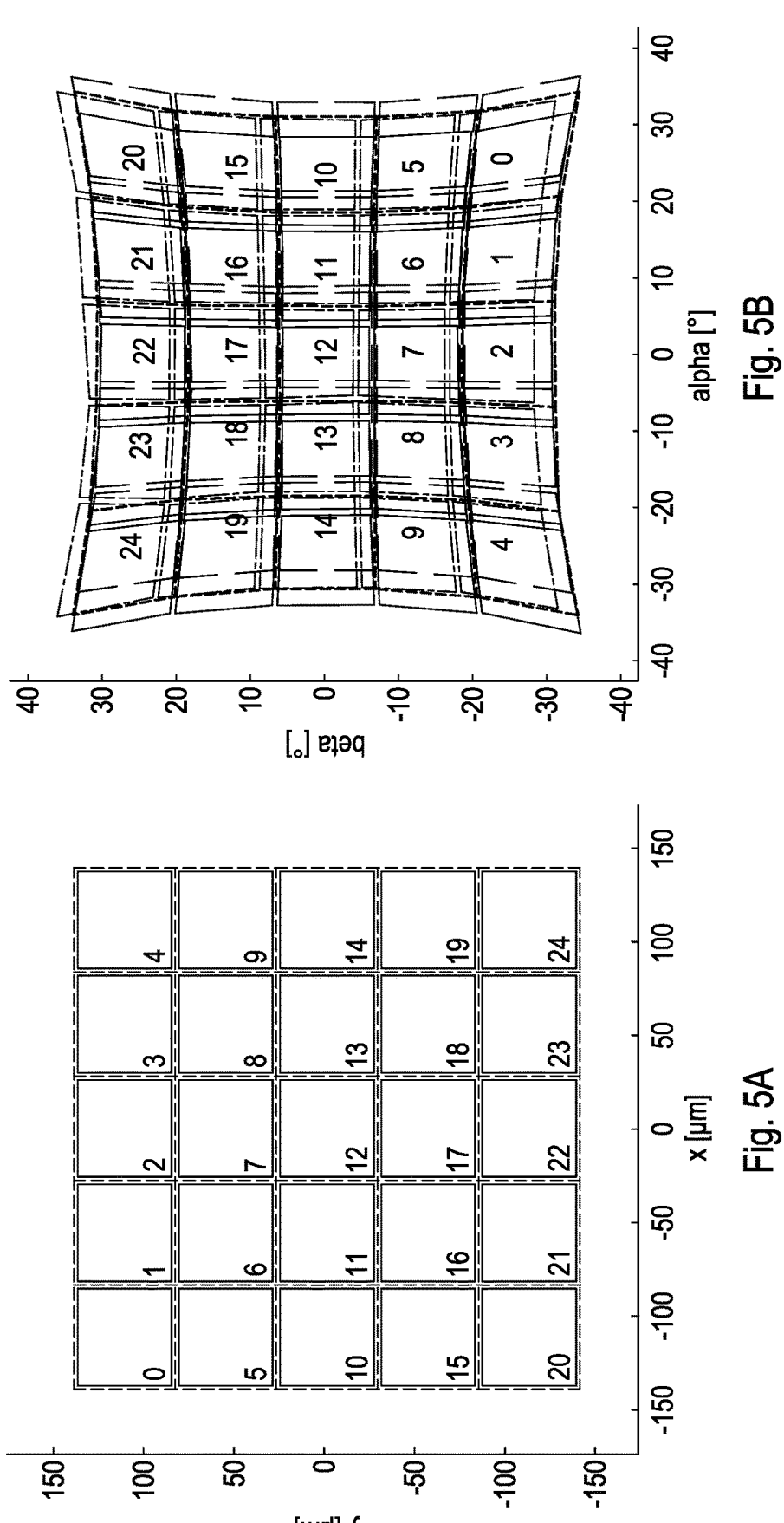
FIG. 5A is a schematic plan view of a sub-array of optical detector regions of the monolithic multi-spectral ambient light sensor (ALS) semiconductor chip of FIG. 4.
FIG. 5B shows the simulated projected angular distributions of the outlines of the optical detector regions of different sub-arrays of differently misaligned spectral channels of the multi-spectral ALS of FIG. 3A projected into a FOV of the multi-spectral ALS of FIG. 3A.

FIG. 5A shows the sub-array 112 of optical detector regions 111 of one of the spectral detection channels 176 in more detail. The sub-array 112 of optical detector regions 111 comprises a uniform 5×5 array of optical detector regions 111 arranged on a pitch of 56 μm, wherein adjacent optical detector regions 111 are separated by a gap of 3 μm. As will be described in more detail below with reference to FIGS. 7A to 23, the optical detector regions 111 may be arranged in a 2D array other than a 5×5 array. For example, the optical detector regions 111 may be arranged in a 11×11 array or a 15×15 array. Also, the pitch of the optical detector regions 111 may different to 56 μm. For example, the pitch of the optical detector regions 111 may be 80 μm, 36 μm or 26 μm.

In use, any light which is incident on any one of the apertures 160a of the multi-spectral ALS 102 along a direction parallel to the optical axis 140 is focussed by the corresponding lens arrangement 170 to a focal position in a plane which is offset in z above the plane of the corresponding sub-array 112 of optical detector regions 111 before passing through the corresponding optical filter 166, wherein the focal position corresponds in x and y to a centre position of the corresponding sub-array 112 of optical detector regions 111 coinciding with the central optical detector region 111 which is identified with the label "12" in FIG. 5A. Similarly, any light which is incident on any one of the apertures 160a of the multi-spectral ALS 102 along a direction which is oblique to the optical axis 140 of the multi-spectral ALS 102 is focused by the lens arrangement 170 to a focal position in a plane which is offset in z above the plane of the corresponding sub-array 112 of optical detector regions 111 before passing through the corresponding optical filter 166, wherein the focal position corresponds in x and y to a peripheral position of the corresponding sub-array 112 of optical detector regions 111 which may coincide with one of the peripheral optical detector regions 111 identified with the labels "0" to "11" and "13" to "24" in FIG. 5A.

Referring back to FIG. 2A, the smartphone 101 includes a processing resource 180 which is configured to receive data from the multi-spectral ALS 102 and the image sensor (not shown) of the camera 104. The processing resource 180 is configured to associate different electrical signals generated by different optical detector regions 111 of the same sub-array 112 of optical detector regions 111 with light incident on the multi-spectral ALS 102 from different sectors of a scene in the FOV 142 of the multi-spectral ALS 102. Conversely, the processing resource 180 is configured to associate different electrical signals generated by corresponding optical detector regions 111 of different sub-arrays 112 with light incident on the multi-spectral ALS 102 from the same sector of the scene in the FOV 142 of the multi-spectral ALS 102.

Moreover, the processing resource 180 is configured to associate the electrical signal generated by any optical detector region 111 of any given sub-array 112 with the optical transmission spectrum of the corresponding optical filter 166. Since each optical filter 166 has a different passband, the different electrical signal values measured by corresponding optical detector regions 111 of different sub-arrays 112 of optical detector regions 111 are representative of an optical spectrum of the light incident on the multi-spectral ALS 102 from the same sector of the scene.

The processing resource 180 is configured to determine an ambient light source classification for each sector of the scene based on a comparison between the electrical signal values corresponding to each sector of the scene and pre-defined spectral data. The predefined spectral data may, for example, comprise a plurality of different spectra, each spectrum corresponding to a different known type or known kind of ambient light source.

In addition, the processing resource 180 is configured to adapt an image sensed by the camera 104 based upon the ambient light source classification for each sector of the scene. Specifically, the processing resource 180 is configured to adapt the sensed image by white-balancing the image based upon one or more parameters of the ambient light source classification for each sector of the scene, for example by gradient white-balancing the image based upon one or more parameters of the ambient light source classification for each sector of the scene.

During production of the multi-spectral ALS 102, the alignment tolerance between the aperture member 160 and the monolithic multi-spectral ALS semiconductor chip 110 and the alignment tolerance between the MLAs 161a, 161b and the monolithic multi-spectral ALS semiconductor chip 110 may each be 3-5 μm. In effect, this means that the cumulative alignment error for one or more of the spectral channels may be 10-15 μm resulting in differences between the signals detected by different spectral channels 176. It should be understood that these signal differences are associated with misalignment between the between the aperture member 160 and the monolithic multi-spectral ALS semiconductor chip 110 and with misalignment between the MLAs 161a, 161b and the monolithic multi-spectral ALS semiconductor chip 110 for different spectral channels 176 and is independent of signal differences between spectral channels 176 as a result of the spectral distribution of the light incident on the multi-spectral ALS 102 from the scene. Chromatic aberration from spectral channel 176 to spectral channel 176 can also contribute to the differences between the signals detected by different spectral channels 176. The resulting differences between the signals detected by different spectral channels 176 caused by these effects reduces the accuracy of the spectral reconstruction method used to classify the spectrum of the light received from the different sectors of the scene in the FOV 142 of the multi-spectral ALS 102.

As explained below with reference to FIGS. 5B to 23, the degree of blurring of the image formed by the light when it reaches the optical detector regions 111 of each sub-array 112 of optical detector regions 111 is selected so that the differences between the signals detected by different spectral channels 176 caused by different alignment errors between the different spectral channels 176 can be reduced using a compensation method to such an extent that spectral reconstruction can be used to accurately classify the spectrum of the light received from the different sectors of a scene in the FOV 142 of the multi-spectral ALS 102 without unduly increasing the number of optical detector regions 111 of each sub-array 112.

FIG. 5B shows simulated projected angular distributions of the outlines of the optical detector regions 111 of different sub-arrays 112 projected to corresponding different sectors of the scene in the FOV 142 of the multi-spectral ALS 102 using a mathematical model of each spectral channel 176. The different sectors of the scene are identified with labels "0" to "24". Distortion means that the simulated projected angular distribution of the outlines of the different optical detector regions 111 of different sub-arrays 112 are not square.

The black dashed line shows a simulated projected angular distribution of the outlines of the optical detector regions 111 of a sub-array 112 of an aligned spectral channel 176 projected into the FOV 142 of the multi-spectral ALS 102 for the ideal case when the aperture 160a and the lens arrangement 170 of the first spectral channel 176 are aligned with the corresponding sub-array 112 of the optical detector regions 111 in x and y so that the centre of the projection of the sub-array 112 of optical detector regions 111 is aligned with the centre of the FOV 142.

The red line shows a simulated projected angular distribution of the outlines of the optical detector regions 111 of a sub-array 112 of a first misaligned spectral channel 176 projected into the FOV 142 of the multi-spectral ALS 102 for the case when the aperture 160a and the lens arrangement 170 of the first misaligned spectral channel 176 are misaligned together by 10 μm in the positive x direction, but aligned in y, relative to the corresponding sub-array 112 of the optical detector regions 111.

The green line shows a simulated projected angular distribution of the outlines of the optical detector regions 111 of a sub-array 112 of a second misaligned spectral channel 176 projected into the FOV 142 of the multi-spectral ALS 102 for the case when the aperture 160a and the lens arrangement 170 of the second misaligned spectral channel 176 are misaligned together by 10 μm in the positive y direction, but aligned in x, relative to the corresponding sub-array 112 of the optical detector regions 111.

The blue line shows a simulated projected angular distribution of the outlines of the optical detector regions 111 of a sub-array 112 of a third misaligned spectral channel 176 projected into the FOV 142 of the multi-spectral ALS 102 for the case when the aperture 160a and the lens arrangement 170 of the third misaligned spectral channel 176 are misaligned together by 10 μm in the negative x direction, but aligned in y, relative to the corresponding sub-array 112 of the optical detector regions 111.

Figure 6B:
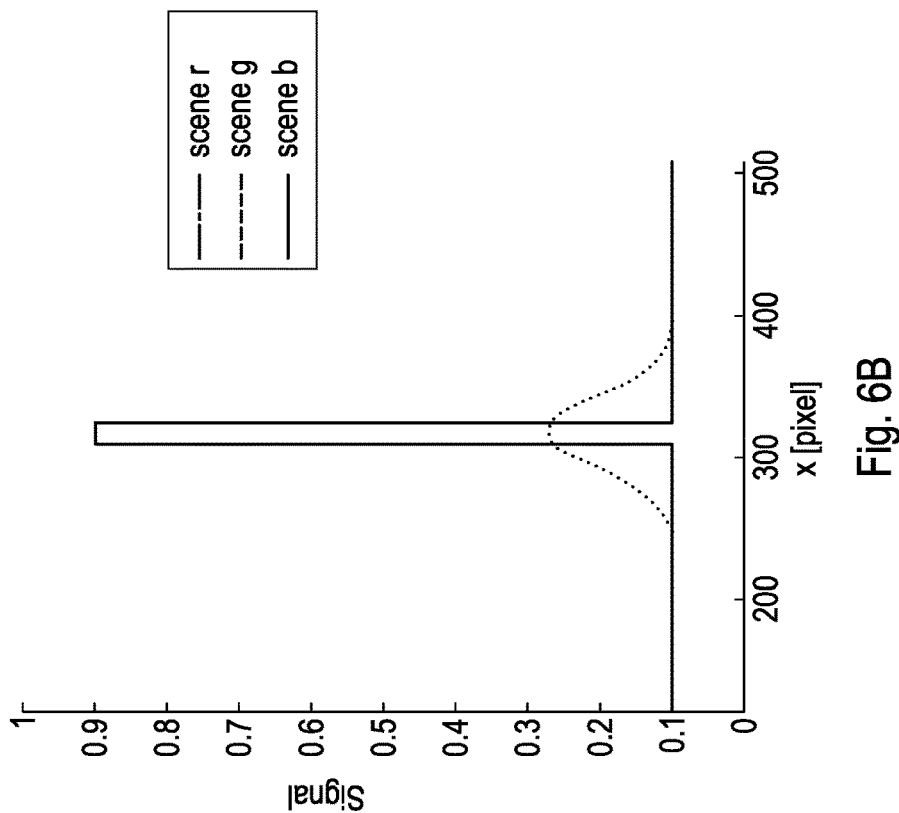
FIG. 6B shows the simulated detected signal distributions and the simulated detected signals for each optical detector region in a middle row of optical detector regions and for each misaligned spectral channel corresponding to FIG. 6A.
Figure 6A:
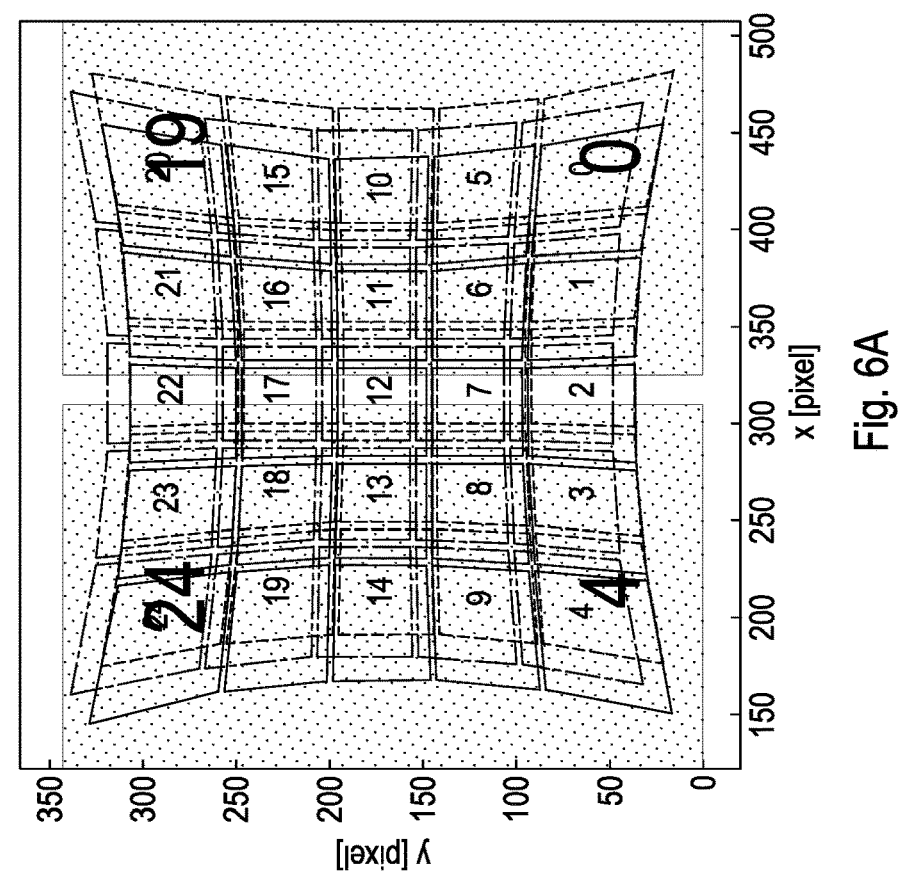
FIG. 6A shows the simulated projected positional distributions of the outlines of the optical detector regions of different sub-arrays of differently misaligned spectral channels of the multi-spectral ALS of FIG. 3A projected into a FOV of the multi-spectral ALS of FIG. 3A and a white line object in the FOV, for optical detector regions on a pitch of 80 μm.

FIG. 6A shows simulated projected positional distributions of the outlines of the optical detector regions 111 of three differently misaligned spectral channels 176, wherein the optical detector regions 111 of the three differently misaligned spectral channels 176 are projected to corresponding sectors of the scene in the FOV 142 of the multi-spectral ALS 102 using a mathematical model of each misaligned spectral channel 176, for an optical detector region 111 pitch of 80 μm and for three different misalignments between the aperture 160a and the lens arrangement 170 of each misaligned spectral channel 176 relative to the corresponding sub-array 112 of the optical detector regions 111, namely misalignments of +10 μm in x, +10 μm in y, and −10 μm in x. The different sectors of the scene are identified with labels "0" to "24".

FIG. 6A also shows the optical intensity distribution in the scene in the form of a central constant intensity vertically-oriented brighter intensity stripe region on a lower intensity background.

The solid lines in FIG. 6B show the simulated detected signals for each misaligned spectral channel 176 as a function of x at y=172 in FIG. 6A. It should be understood that each simulated detected signal for each sector of the scene is determined by integrating the intensity distribution for each misaligned spectral channel 176 as a function of x at y=172 of FIG. 6A over the sector of the scene. One of skill in the art will understand that determining the simulated detected signals in this way is mathematically equivalent to determining the detected signals for the case when light from the scene is incident on the aperture 160a and is imaged by the corresponding lens arrangement 170 through the corresponding optical filter 166 to the corresponding optical detector regions 111 of each misaligned spectral channel 176 in the absence of any blur i.e. when the focal plane coincides with the plane of the optical detector regions 111.

The dotted lines in FIG. 6B show the simulated detected signal distributions for each misaligned spectral channel 176 as a function of x at y=172 in FIG. 6A when a blur factor is applied to the positional distribution of optical intensity in the scene.

FIG. 7A shows a spatially modulated optical intensity distribution of a blurred scene formed by applying a FWHM intensity blur of 110 μm to an initial scene comprising a central vertically-oriented brighter constant intensity stripe region on a lower intensity background to obtain a blurred scene and spatially modulating the blurred scene by the simulated projected positional distributions of the optical detector regions 111 of three differently misaligned spectral channels 176 projected to corresponding different sectors of the scene in the FOV 142 of the multi-spectral ALS 102 using a mathematical model of each misaligned spectral channel 176, for optical detector regions 111 arranged in a 5×5 array on a pitch of 80 μm and for three different misalignments between the aperture 160a and the lens arrangement 170 of each misaligned spectral channel 176 relative to the corresponding sub-array 112 of the optical detector regions 111, namely misalignments of +10 μm in x, +10 μm in y, and −10 μm in x. The ratio of the FWHM intensity blur of 110 μm to the pitch of 80 μm of the optical detector regions 111 is 1.375. The different sectors of the scene are identified with labels "0" to "24". It should be understood that the FWHM intensity blur used to obtain the blurred scene is equivalent to a FWHM of the optical intensity distribution in the plane of the optical detector regions 111 corresponding to a sector of the FOV 142.

In FIG. 7B, the dotted lines represent the simulated detected signal distributions for each of the three differently misaligned spectral channels 176 as a function of x at y=172 in FIG. 7A. One of skill in the art will understand that determining the simulated detected signal distributions in this way is mathematically equivalent to determining the detected signal distributions for the case when light from the initial scene is incident on the aperture 160a and is imaged by the corresponding lens arrangement 170 through the corresponding optical filter 166 to the corresponding optical detector regions 111 for each misaligned spectral channel 176 in the presence of blur i.e. when the focal plane is offset in z from the plane of the optical detector regions 111 as described above with reference to FIGS. 3A and 3B.

In FIG. 7B, the solid lines represent the simulated detected signals for each misaligned spectral channel 176 as a function of x at y=172 in FIG. 7A. It should be understood that each simulated detected signal for each sector of the blurred scene is determined by integrating the simulated detected signal distribution for each misaligned spectral channel 176 as a function of x at y=172 of FIG. 7A over the sector of the scene i.e. by integrating each simulated detected signal distribution represented by each dotted line in FIG. 7B across the sector of the scene. One of skill in the art will understand that determining the simulated detected signals in this way is mathematically equivalent to determining the detected signals for the case when light from the initial scene is incident on the aperture 160a and is imaged by the corresponding lens arrangement 170 through the corresponding optical filter 166 to the corresponding optical detector regions 111 of each misaligned spectral channel 176 in the presence of blur i.e. when the focal plane is offset in z from the plane of the optical detector regions 111 as described above with reference to FIGS. 3A and 3B.

FIG. 7C shows the % error in the signal for each optical detector region 111 in the middle row of optical detector regions 111 labelled "10" to "14" corresponding to the solid lines in FIG. 7B for each of the three differently misaligned spectral channels 176, wherein the % errors in the signals are calculated relative to the ideal spectral channel 176 when the aperture 160a and the lens arrangement 170 of the spectral channel 176 are aligned with the corresponding sub-array 112 of the optical detector regions 111 in x and y so that the centre of the projection of the corresponding sub-array 112 of optical detector regions 111 is aligned with the centre of the FOV 142. The mean absolute % error in the signals is 4.28%.

The misalignment of each spectral channel 176 may be measured using a calibration procedure comprising positioning a suitable reference pattern, such as a predetermined black and white pattern with markers in the centre and close to the corners, in the FOV 142 of the multi-spectral ALS 102, using each optical detector region 111 of each spectral channel 176 of the multi-spectral ALS 102 to detect a signal value corresponding to the reference pattern, and, for each spectral channel 176, using a difference between the detected signal values for each optical detector region 111 and the expected signal values for each optical detector region 111 for the ideal case when the aperture 160a and the lens arrangement 170 of the spectral channel 176 are aligned with the corresponding sub-array 112 of the optical detector regions 111 in x and y to determine the misalignment of the spectral channel 176 in x and y. One of ordinary skill in the art will understand that a variety of different reference patterns may be used for the calibration procedure.

Following calibration, data interpolation may be used to adjust the detected signals of FIGS. 7A-7C so as to at least partially compensate for the measured misalignment of each spectral channel 176 resulting in the compensated spatially modulated optical intensity distribution of the blurred scene as shown in FIG. 8A, the simulated detected signal distributions for each of the three differently misaligned spectral channels 176 represented by the dotted lines in FIG. 8B, the simulated detected signals for each of the three differently misaligned spectral channels 176 represented by the solid lines in FIG. 8B, and the % error in the signal for each optical detector region 111 of the middle row of optical detector regions 111 for each of the three differently misaligned spectral channels 176 as shown in FIG. 8C. Following compensation, the mean absolute % error in the detected signals due to the different misalignments of the spectral channels 176 is reduced to 4.04%. As will be described in more detail below, compensation in this way may improve the accuracy of spectral reconstruction for each sector of the FOV 142. However, as will be described in more detail below with reference to FIGS. 21-23, a mean absolute % error in the signals of <1% may be required for accurate spectral reconstruction.

FIG. 9A shows a spatially modulated optical intensity distribution of the same blurred scene described with reference to FIG. 7A and formed by applying a FWHM intensity blur of 110 μm to an initial scene comprising a central vertically-oriented brighter constant intensity stripe region on a lower intensity background to obtain a blurred scene and spatially modulating the blurred scene by the simulated projected positional distributions of the optical detector regions 111 of three differently misaligned spectral channels 176 projected to corresponding different sectors of the scene in the FOV 142 of the multi-spectral ALS 102 using a mathematical model of each misaligned spectral channel 176, for optical detector regions 111 arranged in a 11×11 array on a pitch of 36 μm and for three different misalignments between the aperture 160a and the lens arrangement 170 of each misaligned spectral channel 176 relative to the corresponding sub-array 112 of the optical detector regions 111, namely misalignments of +10 μm in x, +10 μm in y, and −10 μm in x. For FIG. 9A, the ratio of the FWHM intensity blur of 110 μm to the pitch of 36 μm of the optical detector regions 111 is approximately 3.

In FIG. 9B, the dotted lines represent the simulated detected signal distributions for each of the three differently misaligned spectral channels 176 corresponding to the spatially modulated optical intensity distribution of FIG. 9A and the solid lines represent the simulated detected signals for each of the three differently misaligned spectral channels 176 corresponding to the spatially modulated optical intensity distribution of FIG. 9A.

FIG. 9C shows the % error in the signal for each optical detector region 111 in the middle row of optical detector regions 111 corresponding to the solid lines in FIG. 9B for each of the three differently misaligned spectral channels 176. The mean absolute % error in the signals is 4.76%.

Following calibration, data interpolation may be used to adjust the detected signals of FIGS. 9A-9C so as to at least partially compensate for the measured misalignment of each spectral channel 176 resulting in the compensated spatially modulated optical intensity distribution of the blurred scene as shown in FIG. 10A, the simulated detected signal distributions for each of the three differently misaligned spectral channels 176 represented by the dotted lines in FIG. 10B, the simulated detected signals for each of the three differently misaligned spectral channels 176 represented by the solid lines in FIG. 10B, and the % error in the signal for each optical detector region 111 of the middle row of optical detector regions 111 for each of the three differently misaligned spectral channels 176 as shown in FIG. 10C. Following compensation, the mean absolute % error in the detected signals due to the different misalignments of the spectral channels 176 is reduced to 0.49%. Such a mean absolute % error is less than the target mean absolute % error of 1% required for accurate spectral reconstruction.

FIG. 11A shows a spatially modulated optical intensity distribution of the same blurred scene described with reference to FIG. 7A and formed by applying a FWHM intensity blur of 110 μm to an initial scene comprising a central vertically-oriented brighter constant intensity stripe region on a lower intensity background to obtain a blurred scene and spatially modulating the blurred scene by the simulated projected positional distributions of the optical detector regions 111 of three differently misaligned spectral channels 176 projected to corresponding different sectors of the scene in the FOV 142 of the multi-spectral ALS 102 using a mathematical model of each misaligned spectral channel 176, for optical detector regions 111 arranged in a 15×15 array on a pitch of 26 μm and for three different misalignments between the aperture 160a and the lens arrangement 170 of each misaligned spectral channel 176 relative to the corresponding sub-array 112 of the optical detector regions 111, namely misalignments of +10 μm in x, +10 μm in y, and −10 μm in x. For FIG. 11A, the ratio of the FWHM intensity blur of 110 μm to the pitch of 26 μm of the optical detector regions 111 is approximately 4.1.

In FIG. 11B, the dotted lines represent the simulated detected signal distributions for each of the three differently misaligned spectral channels 176 corresponding to the spatially modulated optical intensity distribution of FIG. 11A and the solid lines represent the simulated detected signals for each of the three differently misaligned spectral channels 176 corresponding to the spatially modulated optical intensity distribution of FIG. 11A.

FIG. 11C shows the % error in the signal for each optical detector region 111 in the middle row of optical detector regions 111 corresponding to the solid lines in FIG. 11B for each of the three differently misaligned spectral channels 176. The mean absolute % error in the signals is 4.85%.

Following calibration, data interpolation is used to adjust the detected signals of FIGS. 11A-11C so as to at least partially compensate for the measured misalignment of each spectral channel 176 resulting in the compensated spatially modulated optical intensity distribution of the blurred scene as shown in FIG. 12A, the simulated detected signal distributions for each of the three differently misaligned spectral channels 176 represented by the dotted lines in FIG. 12B, the simulated detected signals for each of the three differently misaligned spectral channels 176 represented by the solid lines in FIG. 12B, and the % error in the signal for each optical detector region 111 of the middle row of optical detector regions 111 for each of the three differently misaligned spectral channels 176 as shown in FIG. 12C. Following compensation, the mean absolute % error in the detected signals due to the different misalignments of the spectral channels 176 is reduced to 0.37%. As will be appreciated from the discussion of FIGS. 21-23 below, such a mean absolute % error is less than the target mean absolute % error of 1% required for accurate spectral reconstruction. However, this reduction in the mean % error is only achieved at the expense of reducing the pitch of the optical detector regions 111 to 26 μm thereby increasing the number of optical detector regions 111 required for each spectral channel 176 for a given FOV 142 to 15. This increases the electronic resources required to implement the optical detector regions 111 and increases the size and/or the cost of the multi-spectral ALS 102. Consequently, a ratio of the FWHM intensity blur to the pitch of the optical detector regions 111 of approximately 3 corresponding to the simulated results shown in FIGS. 9A-9C and 10A-10C represents a good compromise between accuracy of spectral reconstruction and the size and/or the cost of the multi-spectral ALS 102.

Figure 21:
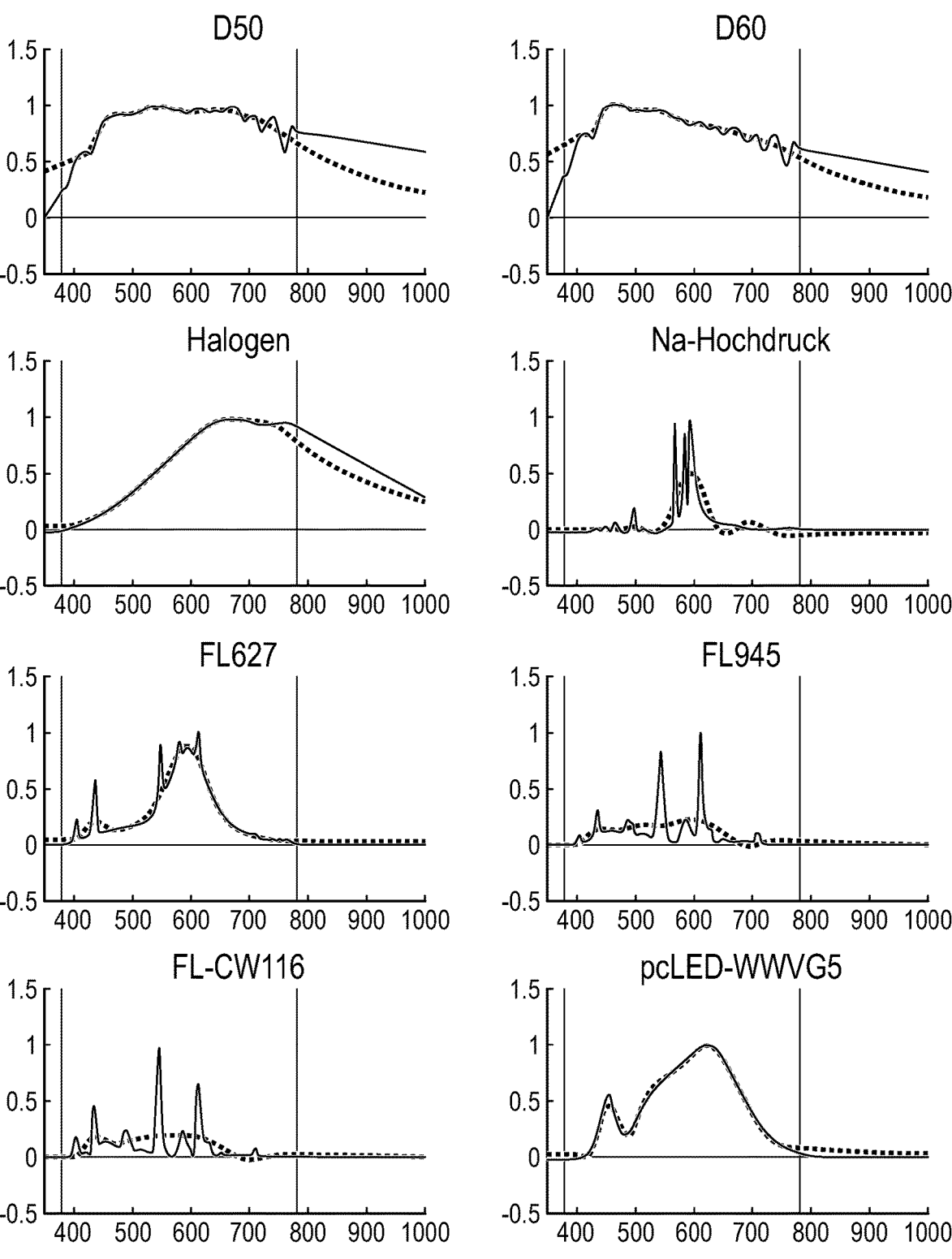
FIG. 21 illustrates the effects of a ±1% signal error due to spectral channel misalignment on the reconstruction of the spectra of 16 different types of light source.
Figure 21:
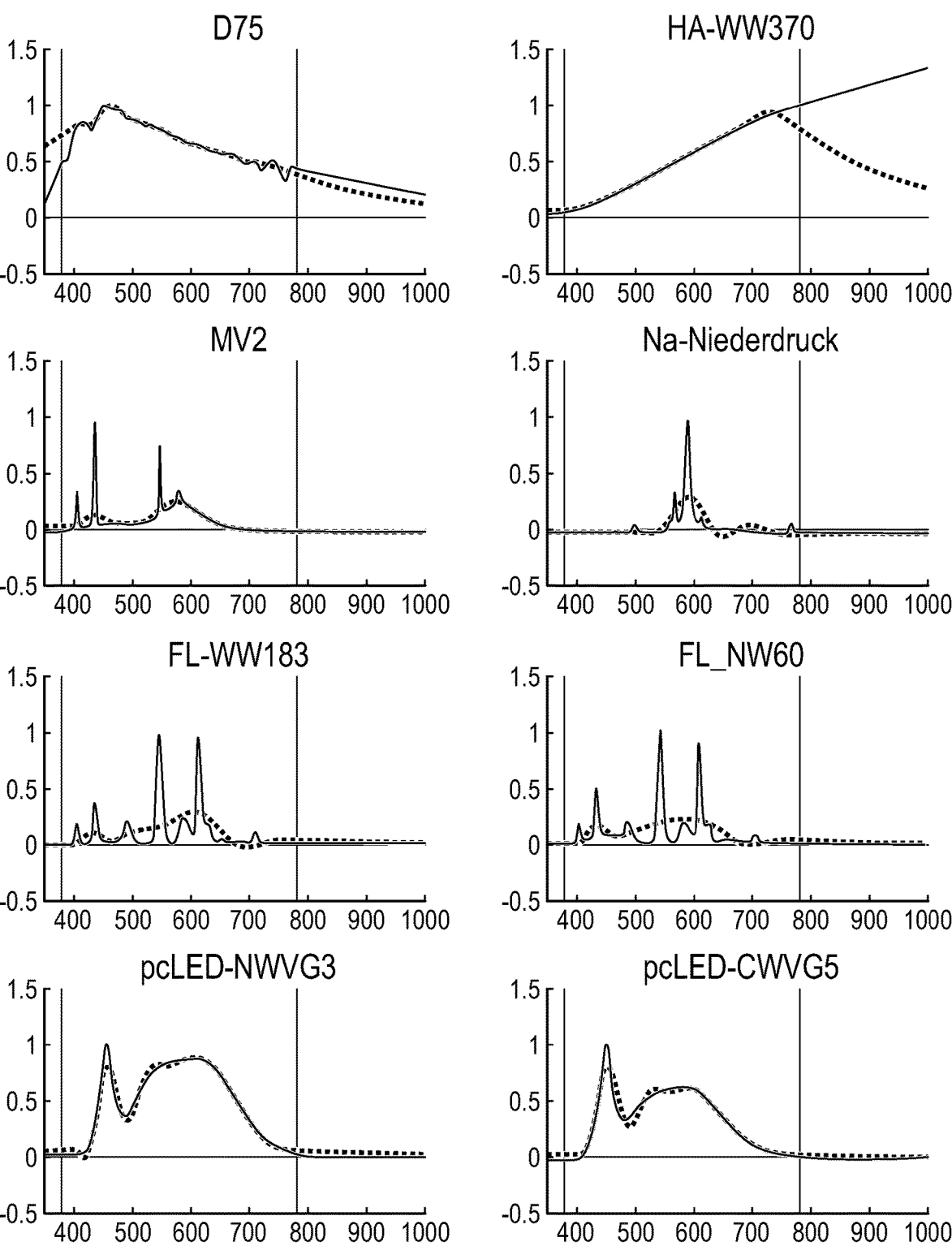
Figure 22:
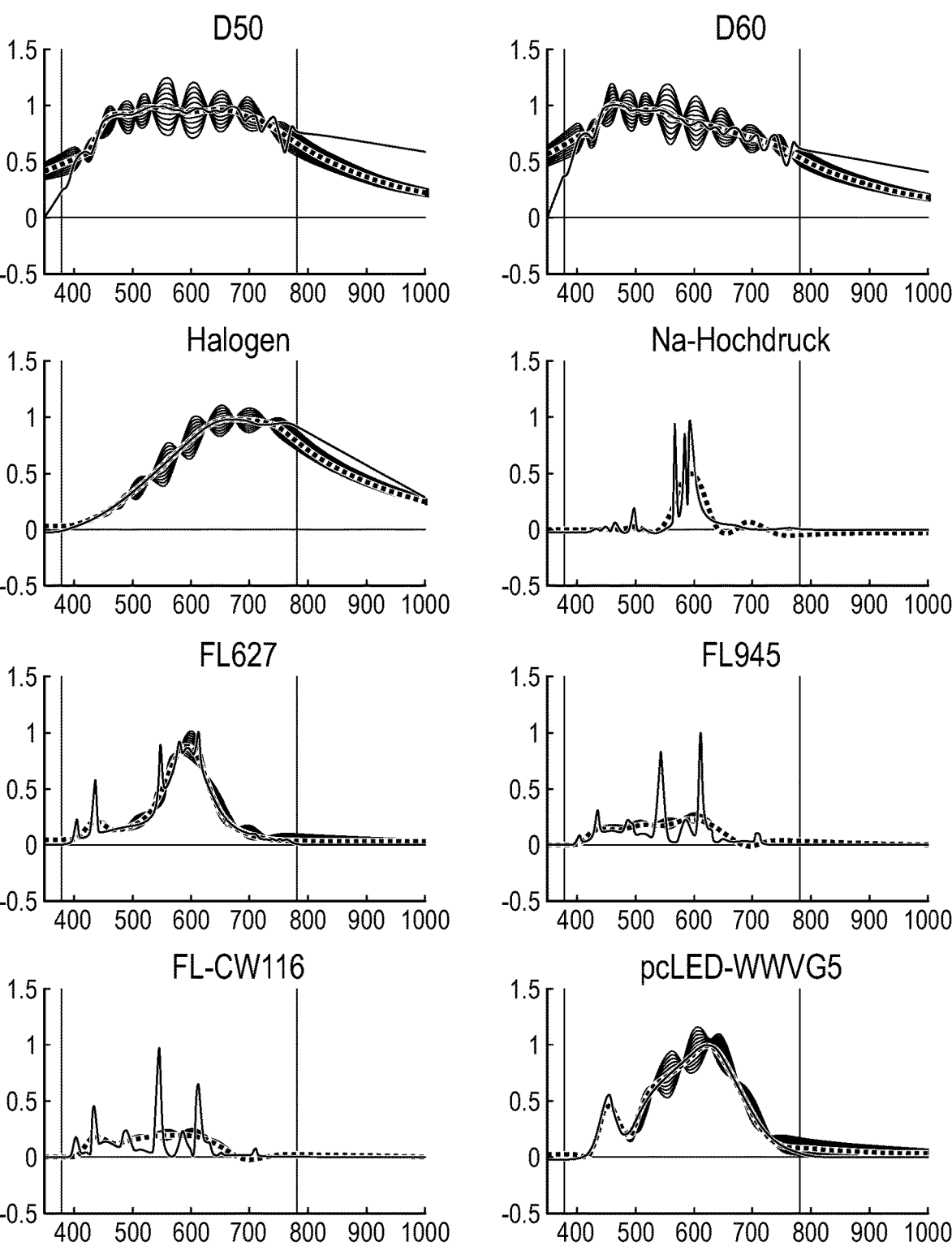
FIG. 22 illustrates the effects of a ±2.5% signal error due to spectral channel misalignment on the reconstruction of the spectra of 16 different types of light source.
Figure 22:
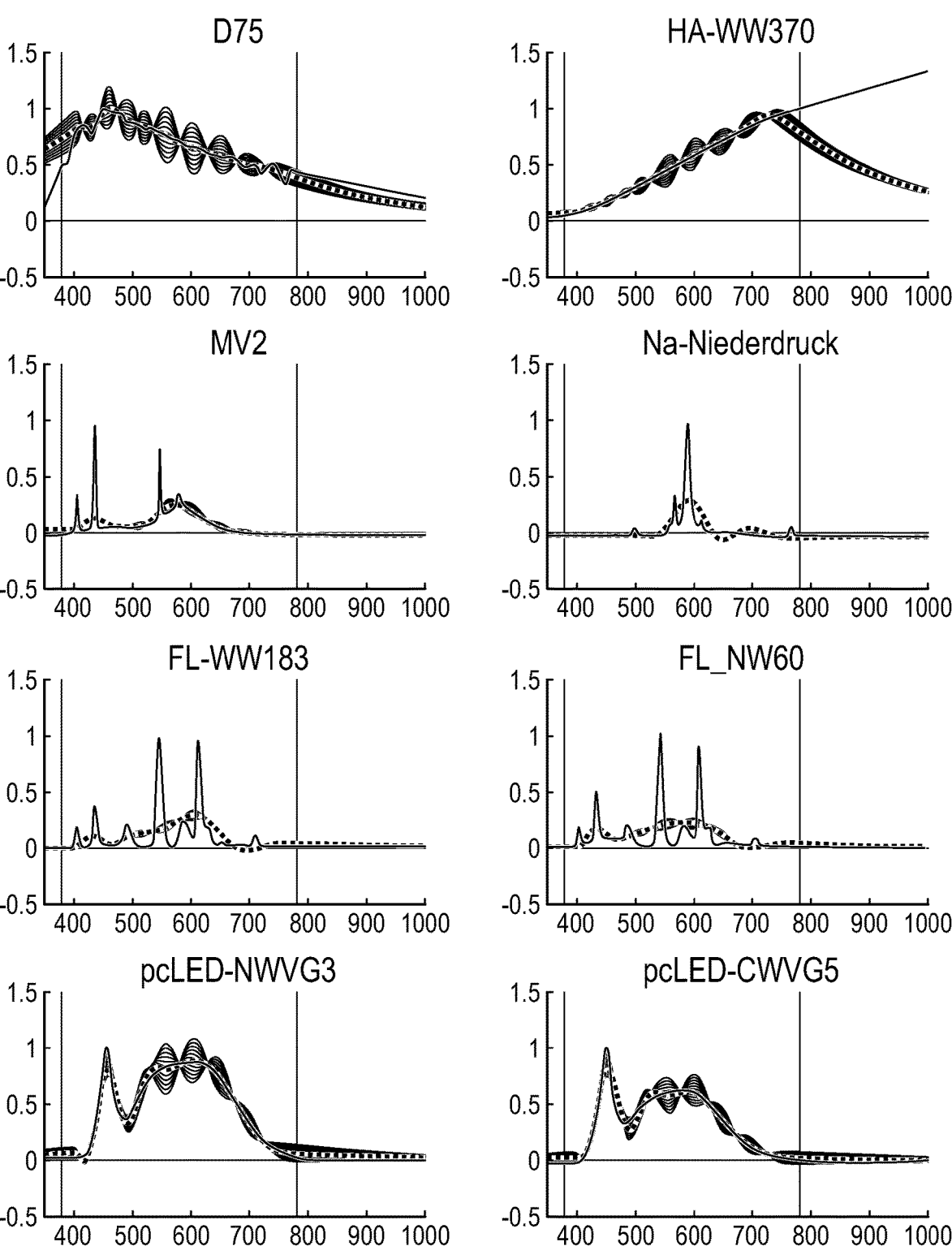
Figure 23:
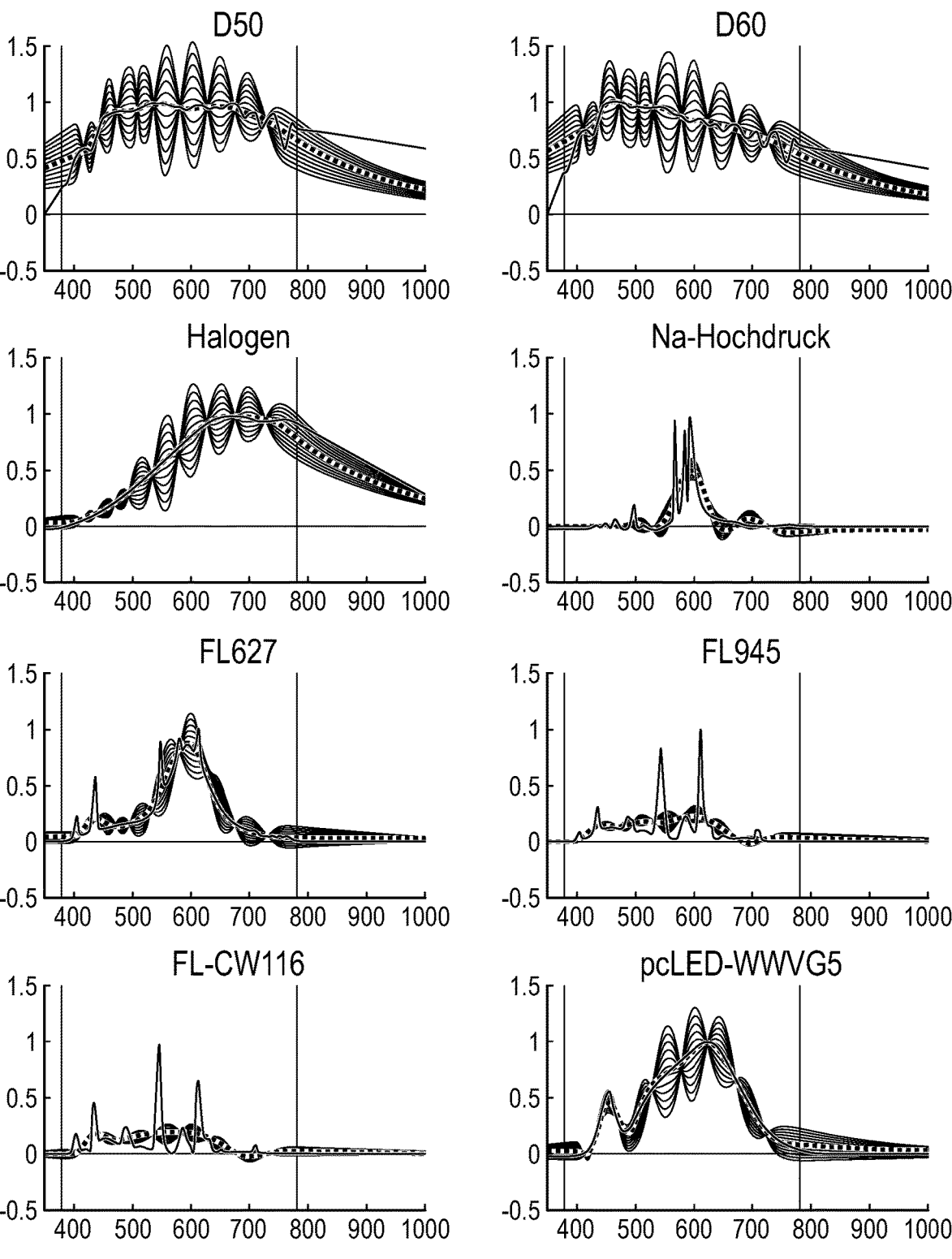
FIG. 23 illustrates the effects of a ±5% signal error due to spectral channel misalignment on the reconstruction of the spectra of 16 different types of light source.
Figure 23:
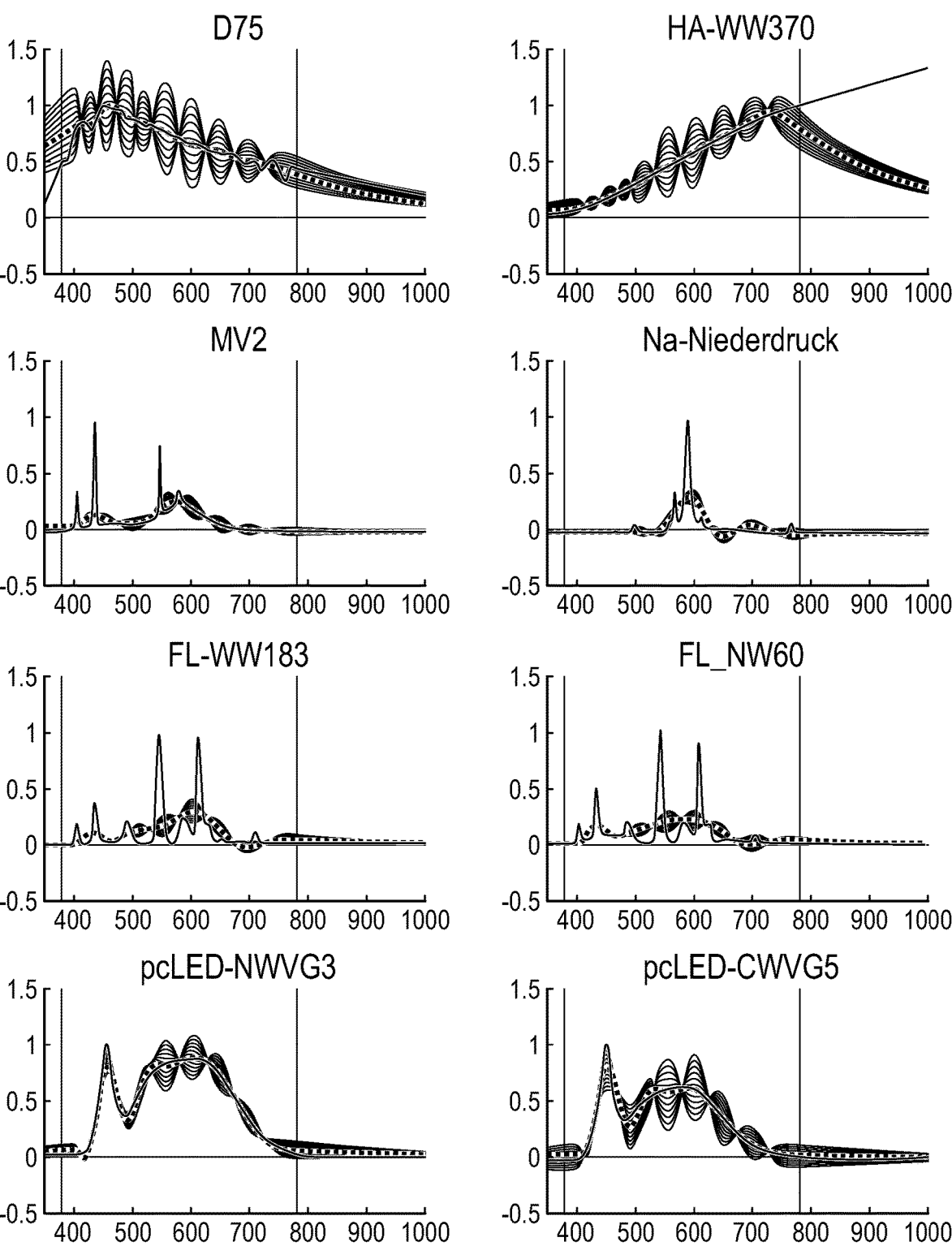

In each of FIGS. 21-23, there is shown the measured optical spectra of 16 different types of light source in blue. The corresponding reconstructed optical spectra obtained from the measured signal values from the different spectral channels 176 are shown in red in each of FIGS. 21-23 for the ideal case when the spectral channels 176 are perfectly aligned and the mean % error in the detected signals is 0%. The reconstructed optical spectra obtained for different mean % errors in the detected signals due to the different misalignments of the spectral channels 176 are shown in black in each of FIGS. 21-23. Specifically, the reconstructed optical spectra shown in black in FIG. 21 correspond to a mean % error of ±1%, the reconstructed optical spectra shown in black in FIG. 22 correspond to a mean % error of ±2.5%, and the reconstructed optical spectra shown in black in FIG. 23 correspond to a mean % error of ±5%. From FIGS. 21-23, it is clear that the mean absolute % error should be less than approximately 1% for accurate spectral reconstruction.

Moreover, the variation in detected signals between differently misaligned spectral channels 176 is dependent on the structures or objects in the scene. Small high intensity spots or hard dynamic structures may result in a variation of up to 20% in the detected signals. Such variations in the detected signals may be significant leading to errors in the spectral reconstruction. Consequently, the simulations of FIGS. 13A to 20A have been performed for different scenes and for different ratios of the FWHM intensity blur to the pitch of the optical detector regions 111.

For example, FIG. 13A shows a spatially modulated optical intensity distribution of a blurred scene formed by applying a FWHM intensity blur of 110 μm to an initial scene comprising a peripheral vertically-oriented brighter constant intensity stripe region on a lower intensity background to obtain a blurred scene and spatially modulating the blurred scene by the simulated projected positional distributions of the optical detector regions 111 of three differently misaligned spectral channels 176 projected to corresponding different sectors of the scene in the FOV 142 of the multi-spectral ALS 102 using a mathematical model of each misaligned spectral channel 176, for optical detector regions 111 arranged in a 5×5 array on a pitch of 80 μm and for three different misalignments between the aperture 160a and the lens arrangement 170 of each misaligned spectral channel 176 relative to the corresponding sub-array 112 of the optical detector regions 111, namely misalignments of +10 μm in x, +10 μm in y, and −10 μm in x. The ratio of the FWHM intensity blur of 110 μm to the pitch of 80 μm of the optical detector regions 111 is 1.375.

In FIG. 13B, the dotted lines represent the simulated detected signal distributions for each of the three differently misaligned spectral channels 176 corresponding to the spatially modulated optical intensity distribution of FIG. 13A and the solid lines represent the simulated detected signals for each of the three differently misaligned spectral channels 176 corresponding to the spatially modulated optical intensity distribution of FIG. 13A.

FIG. 13C shows the % error in the signal for each optical detector region 111 in the middle row of optical detector regions 111 corresponding to the solid lines in FIG. 13B for each of the three differently misaligned spectral channels 176. The mean absolute % error in the signals is 5.27%.

Following calibration, data interpolation is used to adjust the detected signals of FIGS. 13A-13C so as to at least partially compensate for the measured misalignment of each spectral channel 176 resulting in the detected signals of FIGS. 14A-14C and a reduced mean absolute % error of 3.01% in the detected signals due to the different misalignments of the spectral channels 176.

Figures 15A, 15B, 15C, 16A, 16B, 16C:
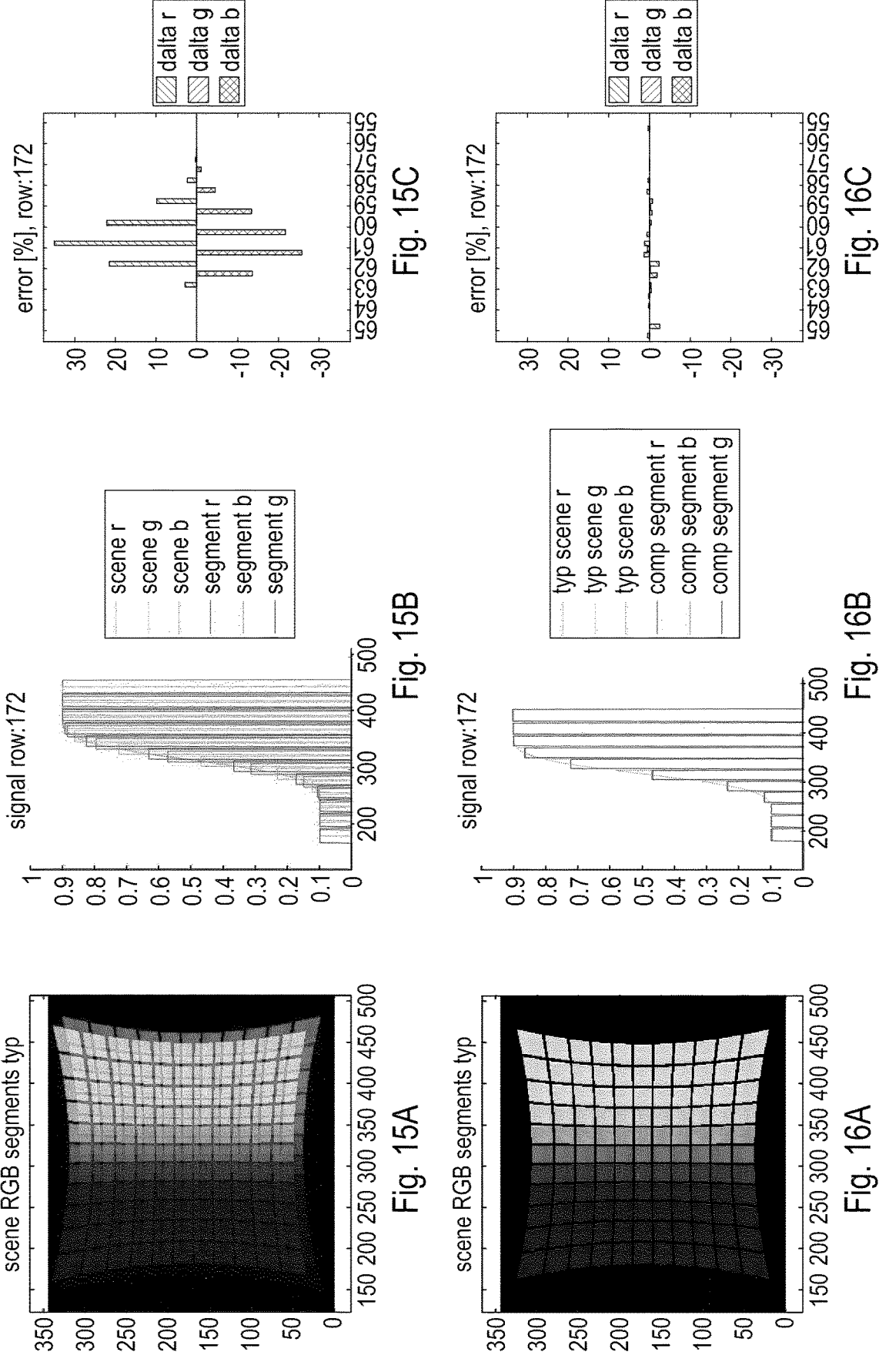
FIG. 15A shows a spatially modulated optical intensity distribution of the second blurred scene for three differently misaligned spectral channels for a FWHM intensity blur of 110 µm and optical detector regions arranged in a 11×11 array on a pitch of 36 µm.
FIG. 15B shows simulated detected signal distributions and simulated detected signals detected by the optical detector regions of each misaligned spectral channel corresponding to the spatially modulated optical intensity distribution of FIG. 15A.
FIG. 15C shows the % error in the signal detected by the optical detector regions of each misaligned spectral channel corresponding to the spatially modulated optical intensity distribution of FIG. 15A.
FIG. 16A shows a compensated spatially modulated optical intensity distribution of the second blurred scene for three differently misaligned spectral channels for a FWHM intensity blur of 110 µm and optical detector regions arranged in a 11×11 array on a pitch of 36 µm.
FIG. 16B simulated detected signal distributions and simulated detected signals detected by the optical detector regions of each misaligned spectral channel corresponding to the spatially modulated optical intensity distribution of FIG. 16A.
FIG. 16C shows the % error in the signal detected by the optical detector regions of each misaligned spectral channel corresponding to the spatially modulated optical intensity distribution of FIG. 16A.

FIG. 15A shows a spatially modulated optical intensity distribution of the same blurred scene described above in relation to FIG. 13A and formed by applying a FWHM intensity blur of 110 μm to an initial scene comprising a peripheral vertically-oriented brighter constant intensity stripe region on a lower intensity background to obtain a blurred scene and spatially modulating the blurred scene by the simulated projected positional distributions of the optical detector regions 111 of three differently misaligned spectral channels 176 projected to corresponding different sectors of the scene in the FOV 142 of the multi-spectral ALS 102 using a mathematical model of each misaligned spectral channel 176, for optical detector regions 111 arranged in a 11×11 array on a pitch of 36 μm and for three different misalignments between the aperture 160a and the lens arrangement 170 of each misaligned spectral channel 176 relative to the corresponding sub-array 112 of the optical detector regions 111, namely misalignments of +10 μm in x, +10 μm in y, and −10 μm in x. The ratio of the FWHM intensity blur of 110 μm to the pitch of 36 μm of the optical detector regions 111 is approximately 3.

In FIG. 15B, the dotted lines represent the simulated detected signal distributions for each of the three differently misaligned spectral channels 176 corresponding to the spatially modulated optical intensity distribution of FIG. 15A and the solid lines represent the simulated detected signals for each of the three differently misaligned spectral channels 176 corresponding to the spatially modulated optical intensity distribution of FIG. 15A.

FIG. 15C shows the % error in the signal for each optical detector region 111 in the middle row of optical detector regions 111 corresponding to the solid lines in FIG. 15B for each of the three differently misaligned spectral channels 176. The mean absolute % error in the signals is 5.30%.

Following calibration, data interpolation is used to adjust the detected signals of FIGS. 15A-15C so as to at least partially compensate for the measured misalignment of each spectral channel 176 resulting in the detected signals of FIGS. 16A-16C and a reduced mean absolute % error of 0.59% in the detected signals due to the different misalignments of the spectral channels 176.

Figures 17A, 17B, 17C, 18A, 18B, 18C:
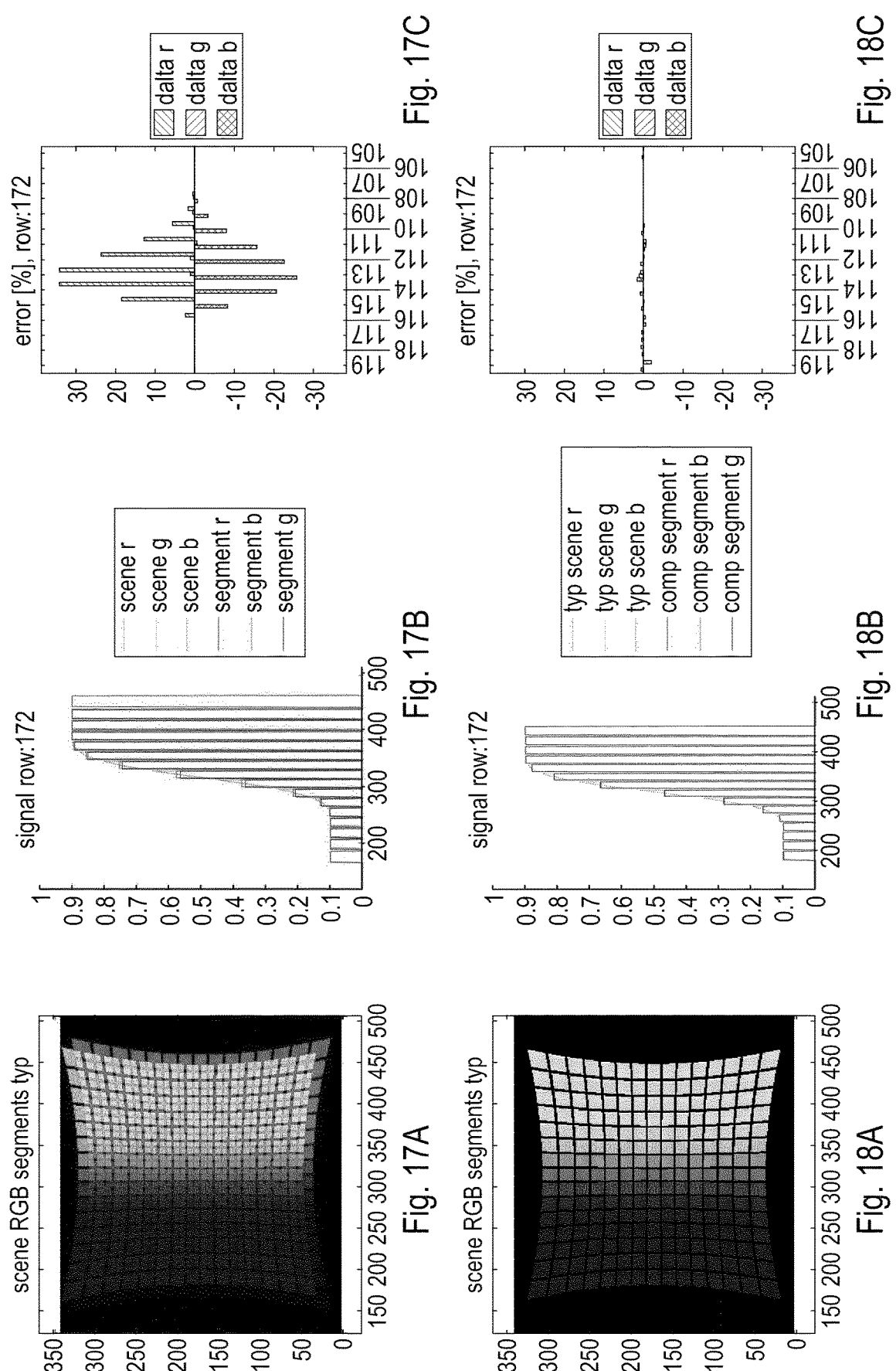
FIG. 17A shows a spatially modulated optical intensity distribution of the second blurred scene for three differently misaligned spectral channels for a FWHM intensity blur of 110 µm and optical detector regions arranged in a 15×15 array on a pitch of 26 µm.
FIG. 17B shows simulated detected signal distributions and simulated detected signals detected by the optical detector regions of each misaligned spectral channel corresponding to the spatially modulated optical intensity distribution of FIG. 17A.
FIG. 17C shows the % error in the signal detected by the optical detector regions of each misaligned spectral channel corresponding to the spatially modulated optical intensity distribution of FIG. 17A.
FIG. 18A shows a compensated spatially modulated optical intensity distribution of the second blurred scene for three differently misaligned spectral channels for a FWHM intensity blur of 110 µm and optical detector regions arranged in a 15×15 array on a pitch of 26 µm.
FIG. 18B simulated detected signal distributions and simulated detected signals detected by the optical detector regions of each misaligned spectral channel corresponding to the spatially modulated optical intensity distribution of FIG. 18A.
FIG. 18C shows the % error in the signal detected by the optical detector regions of each misaligned spectral channel corresponding to the spatially modulated optical intensity distribution of FIG. 18A.

FIG. 17A shows a spatially modulated optical intensity distribution of the same blurred scene described above in relation to FIG. 13A and formed by applying a FWHM intensity blur of 110 μm to an initial scene comprising a peripheral vertically-oriented brighter constant intensity stripe region on a lower intensity background to obtain a blurred scene and spatially modulating the blurred scene by the simulated projected positional distributions of the optical detector regions 111 of three differently misaligned spectral channels 176 projected to corresponding different sectors of the scene in the FOV 142 of the multi-spectral ALS 102 using a mathematical model of each misaligned spectral channel 176, for optical detector regions 111 arranged in a 15×15 array on a pitch of 26 μm and for three different misalignments between the aperture 160a and the lens arrangement 170 of each misaligned spectral channel 176 relative to the corresponding sub-array 112 of the optical detector regions 111, namely misalignments of +10 μm in x, +10 μm in y, and −10 μm in x. The ratio of the FWHM intensity blur of 110 μm to the pitch of 26 μm of the optical detector regions 111 is approximately 4.1.

In FIG. 17B, the dotted lines represent the simulated detected signal distributions for each of the three differently misaligned spectral channels 176 corresponding to the spatially modulated optical intensity distribution of FIG. 17A and the solid lines represent the simulated detected signals for each of the three differently misaligned spectral channels 176 corresponding to the spatially modulated optical intensity distribution of FIG. 17A.

FIG. 17C shows the % error in the signal for each optical detector region 111 in the middle row of optical detector regions 111 corresponding to the solid lines in FIG. 17B for each of the three differently misaligned spectral channels 176. The mean absolute % error in the signals is 5.35%.

Following calibration, data interpolation is used to adjust the detected signals of FIGS. 17A-17C so as to at least partially compensate for the measured misalignment of each spectral channel 176 resulting in the detected signals of FIGS. 18A-18C and a reduced mean absolute % error of 0.34% in the detected signals due to the different misalignments of the spectral channels 176.

FIG. 19A shows a spatially modulated optical intensity distribution of a blurred scene formed by applying a FWHM intensity blur of 110 μm to an initial scene comprising a uniform intensity background to obtain a blurred scene and spatially modulating the blurred scene by the simulated projected positional distributions of the optical detector regions 111 of three differently misaligned spectral channels 176 projected to corresponding different sectors of the scene in the FOV 142 of the multi-spectral ALS 102 using a mathematical model of each misaligned spectral channel 176, for optical detector regions 111 arranged in a 5×5 array on a pitch of 80 μm and for three different misalignments between the aperture 160a and the lens arrangement 170 of each misaligned spectral channel 176 relative to the corresponding sub-array 112 of the optical detector regions 111, namely misalignments of +10 μm in x, +10 μm in y, and −10 μm in x. The ratio of the FWHM intensity blur of 110 μm to the pitch of 80 μm of the optical detector regions 111 is 1.375.

In FIG. 19B, the dotted lines represent the simulated detected signal distributions for each of the three differently misaligned spectral channels 176 corresponding to the spatially modulated optical intensity distribution of FIG. 19A and the solid lines represent the simulated detected signals for each of the three differently misaligned spectral channels 176 corresponding to the spatially modulated optical intensity distribution of FIG. 19A.

FIG. 19C shows the % error in the signal for each optical detector region 111 in the middle row of optical detector regions 111 corresponding to the solid lines in FIG. 19B for each of the three differently misaligned spectral channels 176. The mean absolute % error in the signals is 2.35%.

Following calibration, data interpolation is used to adjust the detected signals of FIGS. 19A-19C so as to at least partially compensate for the measured misalignment of each spectral channel 176 resulting in the detected signals of FIGS. 20A-20C and a reduced mean absolute % error of 0.98% in the detected signals due to the different misalignments of the spectral channels 176.

As may be appreciated from the description of FIGS. 7A-20C above, a ratio of the FWHM intensity blur to the pitch of the optical detector regions 111 of approximately 3 is considered to be optimum for a variety of different scenes because such a ratio may allow sufficient compensation for the measured misalignments of differently aligned spectral channels 176 for accurate spectral reconstruction without unduly increasing the number of optical detector regions for a given FOV 142.

One of ordinary skill in the art will understand that various modifications are possible to the multi-spectral ALS 102 described above. For example, each lens arrangement 170 may comprise fewer or more than two lens elements 170a, 170b. In particular, each lens arrangement 170 may comprise one lens element.

One or more of the lens elements 170a, 170b may comprise a Fresnel lens. One or more of the lens elements 170a, 170b may be defined or formed on a surface of the monolithic multi-spectral ALS semiconductor chip 110 above the corresponding optical filter 166.

In an alternative lens arrangement (not shown), the first and second MLAs 161a, 161b may be arranged such that the focal plane would have coincided with the optical detector regions 111 but where the blurring is achieved instead by introducing one or more optical diffuser elements (not shown) into the optical pathway. It is also envisaged that a combination of this blurring technique with the blurring technique described with reference to FIGS. 3A and 3B may be used.

In each of the foregoing embodiments, each lens arrangement is located between the corresponding aperture and the corresponding optical filter so that light from the scene passes through the corresponding aperture before the light is incident on the lens arrangement. In other embodiments, each aperture may be located between the corresponding lens arrangement and the corresponding optical filter so that light from the scene passes through the corresponding lens arrangement before the light is incident on the corresponding aperture. In other embodiments, each lens arrangement defines the corresponding aperture.

Each optical detector region 111 may be square, rectangular, hexagonal, circular or any other shape.

Other arrangements of the optical detector regions 111 are possible within each sub-array 112. For example, each sub-array 112 may define a 1D or 2D array of optical detector regions 111 of any size.

The optical detector regions 111 of each sub-array 112 may be arranged in a 2D array which is square, rectangular or non-rectangular. Each sub-array 112 may define a central optical detector region 111 surrounded by a plurality of peripheral arcuate optical detector regions 111. Each sub-array 112 may define a central optical detector region 111 surrounded by one or more concentrically arranged annular optical detector regions 111, wherein each annular optical detector region 111 has a different radius.

One of ordinary skill in the art will also understand that other arrangements of the sub-arrays 112 are possible. For example, the sub-arrays 112 may be arranged in a 1D or 2D array of any size. The sub-arrays 112 may be arranged in a 2D array of a size other than the 3×4 array of sub-arrays 112 shown in FIG. 4. The sub-arrays 112 may be arranged in a 2D pattern which is square, rectangular or non-rectangular.

Although a multi-spectral ALS 102 has been described for use with the camera 104 of a smart phone 101, it should be understood that the multi-spectral ALS 102 may be used with a camera of an electronic device of any kind. For example, the multi-spectral ALS 102 may be used with a camera of a mobile phone, a cell phone, a tablet or a laptop.

Although the disclosure has been described in terms of preferred embodiments as set forth above, it should be understood that these embodiments are illustrative only and that the claims are not limited to those embodiments. Those skilled in the art will be able to make modifications and alternatives to the described embodiments in view of the disclosure which are contemplated as falling within the scope of the appended claims. Each feature disclosed or illustrated in the present specification may be incorporated in any embodiment, whether alone or in any appropriate combination with any other feature disclosed or illustrated herein. In particular, one of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Use of the term "comprising" when used in relation to a feature of an embodiment of the present disclosure does not exclude other features or steps. Use of the term "a" or "an" when used in relation to a feature of an embodiment of the present disclosure does not exclude the possibility that the embodiment may include a plurality of such features.

The use of reference signs in the claims should not be construed as limiting the scope of the claims.

LIST OF REFERENCE NUMERALS 1 smartphone;
2 multi-spectral ALS;
4 camera;
8 cover glass;
11 optical detector regions;
20 housing;
22 window;
30 diffuser;
32 IR cut filter;
40 optical axis of multi-spectral ALS;
42 field of view of multi-spectral ALS;
50 optical axis of camera;
52 field of view of camera;
101 smartphone;
102 multi-spectral ALS;
104 camera;
108 cover glass;
110 monolithic multi-spectral ALS semiconductor chip;
111 optical detector regions;
112 sub-array of optical detector regions;
120 housing;
122 window;
132 IR cut filter;
140 optical axis of multi-spectral ALS;
142 field of view of multi-spectral ALS;
150 optical axis of camera;
152 field of view of camera;
160 aperture member'
160a aperture;
161a first microlens array;
161b second microlens array;
162 PCB;
164 frame member;
166 optical filter;
170 lens arrangement
170a convex lens element;
170b convex lens element;
176 spectral channel;
180 processing resource;

The invention claimed is:

1. A multi-spectral optical sensor comprising:
a plurality of apertures;
a plurality of lens arrangements;
a plurality of optical filters; and
a monolithic semiconductor chip defining a plurality of sub-arrays of optical detector regions, each sub-array comprising the same number and relative spatial arrangement of optical detector regions and the optical detector regions of each sub-array being arranged on a predetermined pitch in a direction parallel to a surface of the of the semiconductor chip,
wherein each sub-array of optical detector regions is aligned with a corresponding optical filter, a corresponding lens arrangement and a corresponding aperture, and
wherein the multi-spectral optical sensor is configured so that light from a scene incident on any one of the apertures (160a) along any given direction of incidence is transmitted through said one of the apertures, the corresponding lens arrangement and the corresponding optical filter to the corresponding sub-array of optical detector regions so as to form an out-of-focus image at a plane of the optical detector regions of the corresponding sub-array of optical detector regions such that a ratio of a full-width half maximum (FWHM) of an optical intensity distribution of the out-of-focus image to the predetermined pitch of the optical detector regions in the direction parallel to the surface of the semiconductor chip is greater than or equal to 2.0 and less than or equal to 4.0.

2. The multi-spectral optical sensor as claimed in claim 1, wherein the ratio of a full-width half maximum (FWHM) of the optical intensity distribution of the out-of-focus image to the predetermined pitch of the optical detector regions in the direction parallel to the surface of the semiconductor chip is greater than or equal to 2.5 and less than or equal to 3.5, or substantially equal to 3.

3. The multi-spectral optical sensor as claimed in claim 1, wherein each optical filter is located between the corresponding lens arrangement and the corresponding sub-array of optical detector regions so that light from the scene passes through the corresponding lens arrangement before passing through the corresponding optical filter.

4. The multi-spectral optical sensor as claimed in claim 1, wherein each lens arrangement is located between the corresponding aperture and the corresponding optical filter so that light from the scene passes through the corresponding aperture before the light is incident on the corresponding lens arrangement.

5. The multi-spectral optical sensor as claimed in claim 1, wherein each lens arrangement is aligned to focus the incident light onto a focal plane adjacent to the plane of the optical detector regions to form the out-of-focus image at the plane of the optical detector regions.

6. The multi-spectral optical sensor as claimed in claim 1, wherein the focal plane of each lens arrangement is arranged at a predetermined distance from the plane of the optical detector regions.

7. The multi-spectral optical sensor as claimed in claim 1, comprising a plurality of diffuser elements, wherein each diffuser element is configured to diffuse the incident light to form the out-of-focus image at the plane of the optical detector regions.

8. The multi-spectral optical sensor as claimed in claim 1, wherein the plurality of lens arrangements comprises one or more microlens arrays (MLA).

9. The multi-spectral optical sensor as claimed in claim 1, wherein each lens arrangement comprises one lens element or more than one lens element, for example two lens elements.

10. The multi-spectral optical sensor as claimed in claim 1, wherein each lens arrangement comprises one or more Fresnel lenses.

11. A multi-spectral optical sensing system, comprising:
the multi-spectral optical sensor as claimed in claim 1; and
a processing resource,
wherein the multi-spectral optical sensor and the processing resource are configured for communication with one another, and
wherein the processing resource is configured to:
associate different electrical signals generated by different optical detector regions of the same sub-array of optical detector regions with light incident on the multi-spectral optical sensor from a scene along corresponding different directions of incidence, and
associate different electrical signals generated by corresponding optical detector regions of different sub-arrays of optical detector regions with light incident on the multi-spectral optical sensor from the scene along the same direction of incidence.

12. The multi-spectral optical sensing system as claimed in claim 11, wherein the processing resource is configured to associate the electrical signal generated by an optical detector region with the optical transmission spectrum of the corresponding optical filter.

13. The multi-spectral optical sensing system as claimed in claim 11, wherein the processing resource is configured to determine an ambient light source classification for each direction of incidence of a plurality of different directions of incidence based on a comparison between the electrical signal values corresponding to each direction of incidence and predefined spectral data.

14. The multi-spectral optical sensing system as claimed in claim 13, wherein the predefined spectral data comprises a plurality of spectra, each spectrum corresponding to a different known type or kind of ambient light source.

15. An image sensing system, comprising:
the multi-spectral optical sensing system as claimed in claim 11; and
an image sensor having a known spatial relationship relative to the multi-spectral optical sensor,
wherein the image sensor and the processing resource are configured for communication with one another, and
wherein the processing resource is configured to adapt an image sensed by the image sensor based upon the ambient light source classification for each direction of incidence.

16. The image sensing system of claim 15, wherein the processing resource is configured to adapt the image by white-balancing the image based upon one or more parameters of the ambient light source classification for each direction.

17. The image sensing system of claim 16, wherein said adapting comprises gradient white-balancing the image based upon one or more parameters of the ambient light source classification for each direction of incidence.

18. An electronic device comprising the multi-spectral optical sensor of claim 1.

19. An electronic device comprising the multi-spectral optical system of claim 11.

20. An electronic device comprising the image sensing system of claim 15.

* * * * *